United States Patent
Guo et al.

(10) Patent No.: US 12,413,272 B2
(45) Date of Patent: Sep. 9, 2025

(54) COMMUNICATION METHOD AND APPARATUS

(71) Applicant: HUAWEI TECHNOLOGIES CO., LTD., Guangdong (CN)

(72) Inventors: Wenting Guo, Shenzhen (CN); Hongjia Su, Shanghai (CN); Lei Lu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 18/423,552

(22) Filed: Jan. 26, 2024

(65) Prior Publication Data

US 2024/0187043 A1 Jun. 6, 2024

Related U.S. Application Data

(63) Continuation of application No. PCT/CN2022/104820, filed on Jul. 11, 2022.

(30) Foreign Application Priority Data

Jul. 29, 2021 (CN) .......................... 202110863563.3

(51) Int. Cl.
*H04B 7/0413* (2017.01)
*H04L 1/06* (2006.01)

(52) U.S. Cl.
CPC ............. *H04B 7/0413* (2013.01); *H04L 1/06* (2013.01)

(58) Field of Classification Search
CPC ................................ H04B 7/0413; H04L 1/06
See application file for complete search history.

(56) References Cited

U.S. PATENT DOCUMENTS

| | | | | |
|---|---|---|---|---|
| 2010/0027696 A1* | 2/2010 | Lee | ........................ | H04L 1/0026 375/260 |
| 2010/0284454 A1* | 11/2010 | Oteri | .................... | H03M 13/353 375/224 |
| 2015/0358060 A1* | 12/2015 | Park | .......................... | H04L 1/06 370/329 |
| 2017/0257195 A1* | 9/2017 | Maaref | ................. | H04L 5/0053 |

FOREIGN PATENT DOCUMENTS

| | | |
|---|---|---|
| EP | 3579481 A1 | 12/2019 |
| WO | 2010087666 A2 | 8/2010 |
| WO | 2019052370 A1 | 3/2019 |

OTHER PUBLICATIONS

Extended European Search Report issued in EP22848252.7, dated Oct. 2, 2024, 8 pages.

* cited by examiner

*Primary Examiner* — Janice N Tieu

(57) ABSTRACT

A multiple-input multiple-output communication method is disclosed. The method includes: determining v adjustment factors corresponding to v layers in multiple-input multiple-output, where one layer corresponds to one adjustment factor, and v is an integer greater than 1; and performing an encoding procedure on a transport block based on the v adjustment factors, where the encoding procedure includes: determining a quantity of bits of the transport block, performing rate matching, and performing layer mapping.

20 Claims, 7 Drawing Sheets

COMMUNICATION METHOD AND APPARATUS

CROSS-REFERENCE TO RELATED APPLICATIONS

International Application No. This application is a continuation of PCT/CN2022/104820, filed on Jul. 11, 2022, which claims priority to Chinese Patent Application No. 202110863563.3, filed on Jul. 29, 2021. The disclosures of the aforementioned applications are hereby incorporated by reference in their entireties.

TECHNICAL FIELD

This application relates to the field of communication technologies, and in particular, to a communication method and a communication apparatus.

BACKGROUND

A multiple-input multiple-output (MIMO) technology means to respectively use a plurality of transmit antennas at a transmit end of data and a plurality of receive antennas at a receive end of the data. Compared with a conventional single-input single-output (SISO) system, a MIMO system can suppress channel fading by using a plurality of antennas, and can also improve channel dimensionality and make full use of spatial resources, so that system capacity can be enhanced without increasing frequency resources and increasing transmit power.

When the MIMO technology is used, an encoding procedure may be performed on a transport block (TB) and then an encoded TB is sent. In the encoding procedure, the TB is mapped to a plurality of layers in MIMO, and each layer has a same code rate. Currently, this manner may cause some or all of the layers to have low spectral efficiency, thereby affecting transmission quality.

SUMMARY

Embodiments of this application provide a communication method and a communication apparatus, to improve the spectral efficiency of a MIMO system.

According to a first aspect, a communication method is provided. The method may be performed by a first communication apparatus. The first communication apparatus is, for example, a network device or a terminal device. Alternatively, the first communication apparatus may be a functional module disposed in the network device or the terminal device, or the first communication apparatus may be a communication chip used in the network device or the terminal device. In an example implementation, the network device is, for example, a base station. The method includes: determining v adjustment factors corresponding to v layers in multiple-input multiple-output, where one layer corresponds to one adjustment factor, and v is an integer greater than 1; and performing an encoding procedure on a first transport block based on the v adjustment factors, or in other words, performing an encoding procedure related to the first transport block based on the v adjustment factors, where the encoding procedure includes at least one of the following: determining a quantity of bits of the first transport block, performing rate matching, or performing layer mapping. In other words, the performing an encoding procedure on the first transport block based on the v adjustment factors may include at least one of the following: determining a quantity of bits of the first transport block based on the v adjustment factors, performing rate matching based on the v adjustment factors, or performing layer mapping based on the v adjustment factors. It needs to be understood that the rate matching is rate matching related to the first transport block, and the layer mapping is layer mapping related to the first transport block.

In this embodiment, an adjustment factor corresponding to each layer may be determined, and the adjustment factor may be used to determine spectral efficiency of each layer for a signal that is sent based on MIMO. The technical essence is to determine, based on the adjustment factor, a quantity of encoding symbols mapped to each layer in the step of layer mapping included in the encoding procedure. Because different adjustment factors may be specified for different layers, a code rate for sending information in each layer can be further adjusted on a basis of a code rate that is determined based on an MCS, to obtain different spectral efficiency for different layers. In the layer mapping, the quantity of encoding symbols that can be mapped to each layer needs to be determined based on the adjustment factor, and this essentially affects a quantity of valid REs available for data transmission in a MIMO signal sending process. Therefore, a process of determining a transport block size, a rate matching process, and the like need to be adjusted accordingly. In other words, the transport block size and a quantity of bits output after the rate matching may be determined based on the quantity of valid REs, to ensure that outputs of the rate matching can be allocated based on the adjustment factor to each layer. Considering that a corresponding SINR may be different when a receive end performs receiving in each layer, according to the technical solution in this embodiment, the code rate of each layer (for example, a code rate of a layer is referred to as a layer code rate) determined based on the adjustment factor can match an SINR of the layer as much as possible, so that some or all of the layers can achieve high spectral efficiency as much as possible, thereby improving the transmission quality in a MIMO system.

In an optional implementation, a value of any one of the v adjustment factors is greater than 0 and less than or equal to 1. In this way, code rates of the v layers are all enabled to fall within a range of the code rate determined based on the MCS.

In an optional implementation, the determining a quantity of bits of the first transport block based on the v adjustment factors includes: The quantity of bits of the first transport block meets: $\Sigma_{i=0}^{v-1}(N_{RE,i} \times R \times Q_m \times a_i)$, where $N_{RE,i}$ represents a quantity of available resource elements in an $i^{th}$ layer of the v layers, R represents a code rate determined based on a modulation and coding scheme corresponding to the first transport block, $Q_m$ represents a modulation order of the first transport block, and $a_i$ represents an adjustment factor corresponding to the $i^{th}$ layer in the v adjustment factors. In this embodiment, because an adjustment factor is specified for each layer, a manner of computing the quantity of bits of the first transport block may vary, that is, the manner of computing the quantity of bits of the first transport block is related to the adjustment factors.

It needs to be noted that, when the adjustment factor corresponding to the $i^{th}$ layer is $a_i=1$, it may be understood that there is no adjustment factor for the $i^{th}$ layer. Optionally, not all of the v adjustment factors are 1.

In an optional implementation, the performing rate matching based on the v adjustment factors includes: determining a first quantity, where the first quantity is a quantity of output bits corresponding to the rate-matching of a first code block, and the first code block is a code block included in the first transport block; and when j meets $$j \le C' - \mathrm{mod}\left(\frac{G'}{v \times Q_m}, C'\right) - 1,$$

the first quantity meets a first relationship; or when j does not meet $$j \le C' - \mathrm{mod}\left(\frac{G'}{v \times Q_m}, C'\right) - 1,$$

the first quantity meets a second relationship, where j represents a sequence number of the first code block in code blocks included in the first transport block, C' represents a quantity of effectively transmitted code blocks in the first transport block, $Q_m$ represents the modulation order of the first transport block, $G' = Q_m \times \lfloor \Sigma_{i=0}^{v-1}(N_{RE,i} \times a_i)\rfloor$, $N_{RE,i}$ represents the quantity of available resource elements in the $i^{th}$ layer of the v layers, $a_i$ represents the adjustment factor corresponding to the $i^{th}$ layer of the v layers, mod represents a modulo operation, and $\lfloor x \rfloor$ represents rounding down x. In the encoding process, constellation mapping needs to be performed on the bits output after the rate matching, that is, a bit sequence output after the rate matching is encoded. For example, a complex number may be obtained by encoding every $Q_m$ bits. $N_{RE,i} \times a_i$ represents a quantity of available REs in the $i^{th}$ layer under the effect of the adjustment factor $\Sigma_{i=0}^{v-1}(N_{RE,i} \times a_i)$ represents a total number of available REs in the v layers. A value of $\Sigma_{i=0}^{v-1}(N_{RE,i} \times a_i)$ may include a decimal part. To ensure that G' output after the rate matching is an integer multiple of $Q_m$, rounding processing may be performed on $\Sigma_{i=0}^{v-1}(N_{RE,i} \times a_i)$, to facilitate subsequent processing steps such as encoding and modulation. Herein, a rounding-down manner is used, which is a conservative operation method, that is, it is expected that actual spectral efficiency during sending does not go beyond the expected spectral efficiency that is determined based on the adjustment factors. Alternatively, a rounding-up manner may be used herein, that is, $G' = Q_m \times \lceil \Sigma_{i=0}^{v-1}(N_{RE,i} \times a_i)\rceil$. This is a radical operation method, that is, it is expected that the actual spectral efficiency during sending is determined based on an upper limit of the expected spectral efficiency that is determined based on the adjustment factors. In the rate matching process, a total quantity of bits output after the rate matching may be determined based on the adjustment factor corresponding to each layer of MIMO. In this way, restriction of the adjustment factors on a quantity of encoded bits is reflected, and a total quantity of bits in the layer mapping is obtained.

In an optional implementation, the first relationship includes:

$$E = v \times Q_m \times \left\lfloor \frac{G'}{v \times Q_m \times C'} \right\rfloor,$$

where E represents the first quantity.

In an optional implementation, the second relationship includes:

$$E = v \times Q_m \times \left\lceil \frac{G'}{v \times Q_m \times C'} \right\rceil,$$

where E represents the first quantity and $\lceil x \rceil$ represents rounding up x.

For example, the first transport block includes a plurality of code blocks. If G' cannot be evenly divided by C', a quantity of bits that are of a previous code block included in the first transport block and are output after the rate matching may be enabled to be less than a quantity of bits that are of a subsequent code block included in the first transport block and are output after the rate matching. Herein, "previous" and "subsequent" are related to a value of j. For example, if the sequence number meets $$j \le C' - \mathrm{mod}\left(\frac{G'}{v \times Q_m}, C'\right) - 1,$$

a corresponding code block may be considered as a previous code block in the code blocks included in the first transport block; or if the sequence number meets $$j > C' - \mathrm{mod}\left(\frac{G'}{v \times Q_m}, C'\right) - 1,$$

a corresponding code block may be considered as a subsequent code block in the code blocks included in the first transport block.

$$\frac{G'}{v \times Q_m}$$

represents a quantity of modulation symbols of each of the v layers, and mod $$\left(\frac{G'}{v \times Q_m}, C'\right)$$

represents a remainder obtained after modulation symbols of a layer of the v layers are evenly distributed. To minimize an output difference between the code blocks, one more modulation symbol (or one RE) is allocated to some code blocks (for example, the subsequent code block included in the first transport block) in each layer, and then a total of v more modulation symbols are allocated to these code blocks (for example, the subsequent code block included in the first transport block) in the v layers.

In an optional implementation, the performing layer mapping based on the v adjustment factors includes: determining a second quantity, where the second quantity is a quantity of encoding symbols mapped to the $i^{th}$ layer of the v layers, the encoding symbols mapped to the $i^{th}$ layer of the v layers belong to at least one encoding symbol, and the at least one encoding symbol is obtained after the rate matching in the encoding procedure, scrambling, and constellation mapping are performed on the first transport block, or in other words, the at least one encoding symbol is obtained after the first transport block undergoes the rate matching in the encoding procedure, scrambling, and constellation mapping; and when i meets i≤v-mod($M_{symb}-\Sigma_{i=0}^{v-1}\lfloor N_{RE,i} \times a_i \rfloor$, v)−1, the second quantity meets a third relationship; or when i does not meet i≤v-mod($M_{symb}-\Sigma_{i=0}^{v-1}\lfloor N_{RE,i} \times a_i \rfloor$, v)−1, the second quantity meets a fourth relationship, where $M_{symb}$ represents a total quantity of the at least one encoding symbol, $N_{RE,i}$ represents the quantity of available resource elements in the $i^{th}$ layer of the v layers, $a_i$ represents the adjustment factor corresponding to the $i^{th}$ layer of the v layers, $\lfloor x \rfloor$ represents rounding down x, and mod represents a modulo operation. In the layer mapping, the at least one encoding symbol needs to be mapped to the v layers for transmission, and then a quantity of encoding symbols to which each of the v layers is mapped needs to be determined. For example, for the $i^{th}$ layer of the v layers, the second quantity may be determined, where the second quantity is a quantity of encoding symbols mapped to the $i^{th}$ layer in the at least one encoding symbol; or because the mapping has not started yet in this case, it may also be considered that the second quantity is a quantity of encoding symbols to be allocated to the $i^{th}$ layer in the at least one encoding symbol. Before the layer mapping, bits with a fixed code rate can be obtained after channel coding and rate matching are performed on the transport block that is determined based on the MCS. In this process, the adjustment factors may have affected the quantity of bits included in the transport block and may have affected the bits output after the rate matching. In the layer mapping process, the adjustment factor of each layer may be used to determine the quantity of encoding symbols mapped to each layer. What is actually adjusted is a quantity of information bits that can be transmitted in each layer. By setting the adjustment factor for each layer, the quantity of information bits corresponding to each layer can be obtained. Quantities of information bits that can be transmitted in different layers may be the same or different. Then, the quantity of information bits that can be mapped to each layer are matched with a length of bits that can be sent, to obtain spectral efficiency of each layer for sending information. Due to the existence of the adjustment factor, the layer code rate of each layer matches the SINR of the layer as much as possible, so that the spectral efficiency is high as much as possible.

In an optional implementation, the third relationship includes: $M_{symb}^i = \lfloor N_{RE,i} \times a_i \rfloor + \lfloor (M_{symb} - \Sigma_{i=0}^{v-1} \lfloor N_{RE,i} \times a_i \rfloor)/v \rfloor$, where $M_{symb}^i$ represents the second quantity.

In an optional implementation, the fourth relationship includes: $M_{symb}^i = \lfloor N_{RE,i} \times a_i \rfloor + \lceil (M_{symb} - \Sigma_{i=0}^{v-1} \lfloor N_{RE,i} \times a_i \rfloor)/v \rceil$, where $M_{symb}^i$ represents the second quantity, and $\lceil x \rceil$ represents rounding up x.

An objective of the layer mapping is to allocate the at least one encoding symbol to the v layers based on the adjustment factors, and ensure that the quantity of encoding symbols allocated to each layer essentially meets requirements of the adjustment factors. Because values of the adjustment factors of the layers are not necessarily equal, it needs to be determined, based on $a_i$, that the quantity $M_{symb}^i$ of encoding symbols of the $i^{th}$ layer includes at least $\lfloor N_{RE,i} \times a_i \rfloor$ encoding symbols. When $M_{symb} > \Sigma_{i=0}^{v-1} \lfloor N_{RE,i} \times a_i \rfloor$, in order that all encoding symbols can be sent, remaining encoding symbols may be equally mapped to each layer.

In an optional implementation, the performing layer mapping based on the v adjustment factors includes: determining an encoding symbol sequence, where the encoding symbol sequence includes at least one encoding symbol, and the at least one encoding symbol is arranged sequentially in the encoding symbol sequence, or the at least one encoding symbol is arranged alternately in the encoding symbol sequence; and mapping the encoding symbols included in the encoding symbol sequence to all available resource elements of the v layers. A plurality of manners may be used to map the at least one encoding symbol to the v layers (or, in this case, the mapping is not yet started, and simply the encoding symbols are allocated to the v layers). For example, in a manner, the at least one encoding symbol is sequentially mapped (or allocated) to the v layers. This manner may be understood as that, the first communication apparatus determines an encoding symbol sequence, where the encoding symbol sequence includes at least one encoding symbol, the at least one encoding symbol is arranged sequentially in the encoding symbol sequence; and the first communication apparatus maps (or allocates) the encoding symbols included in the encoding symbol sequence to all available REs of the v layers, to implement layer mapping in a simple manner and aggregate encoding symbols of each code block onto a single layer to a maximum extent, ensuring that encoding symbols of one code block pass through a same channel. When the signal to interference plus noise ratio (signal to interference plus noise ratio, SINR) of each layer varies greatly from each other, this ensures that some code blocks are successfully decoded, thereby reducing a quantity of code blocks to be retransmitted. For another example, in another manner, the at least one encoding symbol is alternately mapped (or allocated) to the v layers. This manner may be understood as that, the first communication apparatus determines an encoding symbol sequence, where the encoding symbol sequence includes at least one encoding symbol, and the at least one encoding symbol is alternately arranged in the encoding symbol sequence, to implement space diversity of code block transmission and ensure transmission fairness of each code block.

In an optional implementation, the method further includes: determining v pieces of channel state information corresponding to the v layers, where one layer corresponds to one piece of channel state information; and determining the v adjustment factors based on the v pieces of channel state information. The first communication apparatus may determine the adjustment factors based on the channel state information corresponding to each layer. In this way, the determined adjustment factors can truly reflect a channel condition, which is accurate.

In an optional implementation, the determining v pieces of channel state information corresponding to the v layers includes: measuring channel states corresponding to the v layers to obtain the v pieces of channel state information; or receiving the v pieces of channel state information. The first communication apparatus may measure the channel states respectively corresponding to the v layers, to obtain the channel state information respectively corresponding to the v layers, where one layer corresponds to one piece of channel state information; and then the first communication apparatus may obtain the v pieces of channel state information. In this manner, the first communication apparatus may perform measurement, and does not need to perform an excessive process of interaction with another communication apparatus, thereby reducing signaling overheads. Alternatively, optionally, a second communication apparatus may measure the channel states respectively corresponding to the v layers, to obtain the channel state information respectively corresponding to the v layers, where one layer corresponds to one piece of channel state information; and then the second communication apparatus may obtain the v pieces of channel state information, and the second communication apparatus sends the v pieces of channel state information to the first communication apparatus, so that the first communication apparatus obtains the v pieces of channel state information. In this manner, the measurement may be performed by the second communication apparatus, and the first communication apparatus does not need to perform a measurement process, so that a workload of the first communication apparatus can be reduced.

In an optional implementation, the method further includes: sending indication information to an apparatus that receives the first transport block, where the indication information indicates the v adjustment factors, or indicates v code rates that correspond to the v layers and are determined based on the v adjustment factors. The second communication apparatus is the receive end of the first transport block, and needs to decode the first transport block. In this case, the second communication apparatus also needs to determine the v adjustment factors. In a determining manner, the first communication apparatus indicates the v adjustment factors to the second communication apparatus by using the indication information, so that the second communication apparatus can determine the v adjustment factors. This manner is flexible. Alternatively, the v adjustment factors may be pre-configured in the first communication apparatus, or predefined in a protocol, so that the second communication apparatus can determine the v adjustment factors simply based on the pre-configured information or the protocol, and does not need an indication from the first communication apparatus, thereby saving signaling overheads.

According to a second aspect, another communication method is provided. The method may be performed by a second communication apparatus. The second communication apparatus is, for example, a network device or a terminal device. Alternatively, the second communication apparatus may be a functional module disposed in the network device, or the second communication apparatus may be a communication chip used in the network device or the terminal device. In an implementation, the network device is, for example, a base station. The method includes: receiving a first signal by using v layers in multiple-input multiple-output; and performing a decoding procedure on the first signal based on v adjustment factors corresponding to the v layers, where one layer corresponds to one adjustment factor, and the decoding procedure includes: determining a quantity of bits of a transport block corresponding to the first signal, performing de-rate matching, and performing de-layer mapping, where v is an integer greater than 1.

In an optional implementation, a value of any one of the v adjustment factors is greater than 0 and less than 1.

In an optional implementation, the determining a quantity of bits of a transport block corresponding to the first signal based on the v adjustment factors includes: The quantity of bits of the transport block meets: $\Sigma_{i=0}^{v-1}(N_{RE,i} \times R \times Q_m \times a_i)$, where $N_{RE,i}$ represents a quantity of available resource elements in an $i^{th}$ layer of the v layers, R represents a code rate determined based on a modulation and coding scheme corresponding to the transport block, $Q_m$ represents a modulation order of the transport block, and $a_i$ represents an adjustment factor corresponding to the $i^{th}$ layer in the v adjustment factors.

In an optional implementation, the performing de-rate matching based on the v adjustment factors includes: determining a first quantity, where the first quantity is a quantity of input bits corresponding to the de-rate matching of a first code block, and the first code block is a code block included in the transport block corresponding to the first signal; and when j meets $$j \le C' - \mathrm{mod}\left(\frac{G'}{v \times Q_m}, C'\right) - 1,$$

the first quantity meets a first relationship; or when j does not meet $$j \le C' - \mathrm{mod}\left(\frac{G'}{v \times Q_m}, C'\right) - 1,$$

the first quantity meets a second relationship, where j represents a sequence number of the first code block in code blocks included in the transport block, C' represents a quantity of effectively transmitted code blocks in the transport block, $Q_m$ represents the modulation order of the transport block, $G'=Q_m \times \lfloor \Sigma_{i=0}^{v-1}(N_{RE,i} \times a_i) \rfloor$, $N_{RE,i}$ represents the quantity of available resource elements in the $i^{th}$ layer of the v layers, $a_i$ represents the adjustment factor corresponding to the $i^{th}$ layer of the v layers, mod represents a modulo operation, and $\lfloor x \rfloor$ represents rounding down x.

In an optional implementation, the first relationship includes:

$$E = v \times Q_m \times \left\lfloor \frac{G'}{v \times Q_m \times C'} \right\rfloor,$$

where E represents the first quantity.

In an optional implementation, the second relationship includes:

$$E = v \times Q_m \times \left\lceil \frac{G'}{v \times Q_m \times C'} \right\rceil,$$

where E represents the first quantity, and $\lceil x \rceil$ represents rounding up x.

In an optional implementation, the performing de-layer mapping based on the v adjustment factors includes: obtaining an encoding symbol sequence to which all available resource elements of the v layers are mapped, where the encoding symbol sequence includes at least one encoding symbol, and the at least one encoding symbol is arranged sequentially in the encoding symbol sequence, or the at least one encoding symbol is arranged alternately in the encoding symbol sequence.

In an optional implementation, when i meets i≤v-mod $(M_{symb}-\Sigma_{i=0}^{v-1}\lfloor N_{RE,i} \times a_i \rfloor, v)-1$, a quantity of encoding symbols mapped to the $i^{th}$ layer of the v layers meets a third relationship; or when i does not meet i≤v-mod$(M_{symb}-\Sigma_{i=0}^{v-1}\lfloor N_{RE,i} \times a_i \rfloor, v)-1$, a quantity of encoding symbols mapped to the $i^{th}$ 1 layer of the v layers meets a fourth relationship, where $M_{symb}$ represents a total quantity of the at least one encoding symbol, $N_{RE,i}$ represents the quantity of available resource elements in the $i^{th}$ layer of the v layers, $a_i$ represents the adjustment factor corresponding to the $i^{th}$ layer of the v layers, $\lfloor x \rfloor$ represents rounding down x, and mod represents a modulo operation.

In an optional implementation, the third relationship includes: $M_{symb}^i = \lfloor N_{RE,i} \times a_i \rfloor + \lfloor (M_{symb}-\Sigma_{i=0}^{v-1}\lfloor N_{RE,i} \times a_i \rfloor)/v \rfloor$, where $M_{symb}^i$ represents the quantity of encoding symbols mapped to the $i^{th}$ layer.

In an optional implementation, the fourth relationship includes: $M_{symb}^i = \lfloor N_{RE,i} \times a_i \rfloor + \lceil (M_{symb}-\Sigma_{i=0}^{v-1}\lfloor N_{RE,i} \times a_i \rfloor)/v \rceil$, where $M_{symb}^i$ represents the quantity of encoding symbols mapped to the $i^{th}$ layer, and $\lceil x \rceil$ represents rounding up x.

In an optional implementation, the method further includes: measuring channel states corresponding to the v layers to obtain v pieces of channel state information, where one layer corresponds to one piece of channel state information; and sending the v pieces of channel state information.

In an optional implementation, the method further includes: receiving indication information, where the indication information indicates the v adjustment factors, or indicates v code rates that correspond to the v layers and are determined based on the v adjustment factors.

For technical effects brought by the second aspect or the optional implementations of the second aspect, refer to descriptions about technical effects brought by the first aspect or the corresponding implementations.

According to a third aspect, a communication apparatus is provided. The communication apparatus may be the first communication apparatus described in the first aspect, or a communication chip configured in the first communication apparatus, or a large device including the first communication apparatus. Alternatively, the communication apparatus may be the second communication apparatus described in the second aspect, or a communication chip configured in the second communication apparatus, or a large device including the second communication apparatus. The communication apparatus includes corresponding means or modules for performing the method according to the first aspect or the second aspect. For example, the communication apparatus includes a processing unit (also referred to as a processing module in some cases) and a transceiver unit (also referred to as a transceiver module in some cases). The transceiver unit can implement a sending function and a receiving function. When implementing the sending function, the transceiver unit may be referred to as a sending unit (also referred to as a sending module in some cases); and when implementing the receiving function, the transceiver unit may be referred to as a receiving unit (also referred to as a receiving module in some cases). The sending unit and the receiving unit may be a same functional module, and the functional module is referred to as the transceiver unit. The functional module can implement the sending function and the receiving function. Alternatively, the sending unit and the receiving unit may be different functional modules, and the transceiver unit is a general term for these functional modules.

For example, the processing unit is configured to determine v adjustment factors corresponding to v layers in multiple-input multiple-output, where one layer corresponds to one adjustment factor, and v is an integer greater than 1; and is further configured to perform an encoding procedure on a first transport block based on the v adjustment factors, where the encoding procedure includes: determining a quantity of bits of the first transport block, performing rate matching, and performing layer mapping.

For another example, the transceiver unit is configured to receive a first signal by using v layers in multiple-input multiple-output; and the processing unit performs a decoding procedure on the first signal based on v adjustment factors corresponding to the v layers, where one layer corresponds to one adjustment factor, and the decoding procedure includes: determining a quantity of bits of a transport block corresponding to the first signal, performing de-rate matching, and performing de-layer mapping, where v is an integer greater than 1.

For another example, the communication apparatus includes a processor, which is coupled to the memory and configured to execute instructions in the memory, to implement the method performed by the first communication apparatus or the second communication apparatus according to either one of the first aspect and the second aspect. Optionally, the communication apparatus further includes another component, for example, an antenna, an input/output module, or an interface. These components may be hardware, or software, or a combination of software and hardware.

According to a fourth aspect, a processing apparatus is provided. The processing apparatus includes a processing module and an interface module. For example, the processing apparatus is used in the communication apparatus, and is configured to implement the functions or the method according to any one of the foregoing aspects or the second aspect. The processing apparatus may be, for example, a chip system. In a feasible implementation, the chip system further includes a memory. The memory is configured to store program instructions and data that are necessary for implementing the functions of the method according to the first aspect or the second aspect.

The chip system in the foregoing aspects may be a system-on-chip (SOC), a baseband chip, or the like. The baseband chip may include a processor, a channel encoder, a digital signal processor, a modem, an interface module, and the like.

Optionally, there are one or more processors, and there are one or more memories.

In a specific implementation process, the memory may be a non-transitory memory, for example, a read-only memory (ROM). The memory and the processor may be integrated onto a same chip, or may be separately disposed on different chips. A type of the memory and a manner of disposing the memory and the processor are not limited in this embodiment. Optionally, the memory may be integrated with the processor, or the memory and the processor are separately disposed. The processor may be implemented by using hardware or software. When the processor is implemented by using the hardware, the processor may be a logic circuit, an integrated circuit, or the like. When the processor is implemented by using the software, the processor may be a general-purpose processor implemented by reading software code stored in a memory, where the memory may be integrated into the processor, or may be located outside the processor and exist independently.

In a specific implementation process, an input signal received by an input interface may be, for example, but is not limited to, received and input by a receiver; and a signal output by an output interface may be, for example, but is not limited to, output to a transmitter and transmitted by the transmitter. In addition, the input interface and the output interface may be a same integrated interface, and the interface is separately used as the input interface and the output interface at different moments. Specific implementations of the processor and various interfaces are not limited in this embodiment.

The memory may be a non-transitory memory, for example, a read-only memory (ROM). The memory and the processor may be integrated onto a same chip, or may be separately disposed on different chips. A type of the memory and a manner of disposing the memory and the processor are not limited in this embodiment.

According to a fifth aspect, a communication system is provided. The communication system includes the first communication apparatus that can implement the method according to the first aspect or the optional implementations of the first aspect, and includes the second communication apparatus that can implement the method according to the second aspect or the optional implementations of the second aspect. For structures of the first communication apparatus and the second communication apparatus, refer to the third aspect.

According to a sixth aspect, a computer-readable storage medium is provided. The computer-readable storage medium is configured to store a computer program or instructions. When the computer program or the instructions are run, the method performed by the first communication apparatus or the second communication apparatus according to the foregoing aspects is implemented.

According to a seventh aspect, a computer program product including instructions is provided. The computer program product includes a computer program (which may also be referred to as code or instructions), and when the computer program runs on a computer, the method according to the foregoing aspects is implemented.

DESCRIPTION OF EMBODIMENTS

To make objectives, technical solutions, and advantages of embodiments of this application clearer, the following further describes embodiments of this application in detail with reference to the accompanying drawings.

Figure 1:
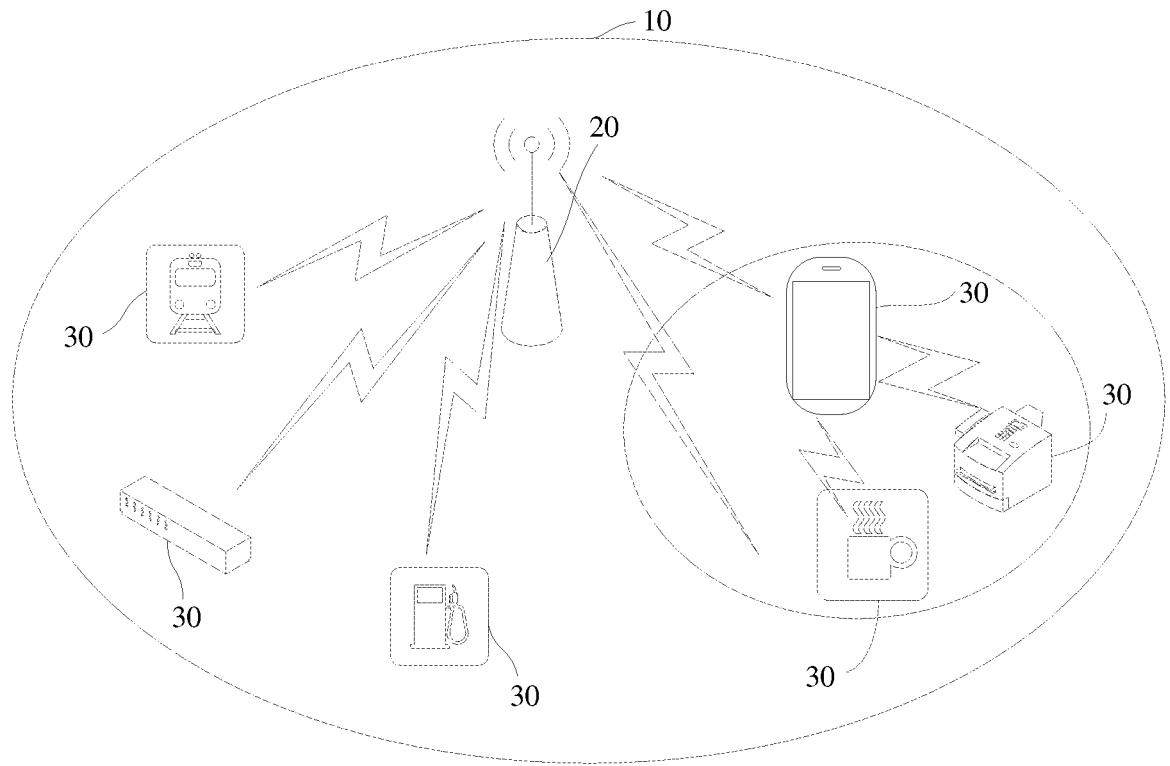
FIG. 1 is a schematic diagram of an example communication system according to an embodiment of this application.

A technology provided in embodiments of this application can be used in a communication system 10 shown in FIG. 1, where the communication system 10 includes one or more communication apparatuses 30 (for example, terminal devices). The one or more communication apparatuses 30 are connected to one or more core-network devices by using one or more access-network devices 20, so that communication is implemented between the plurality of communication apparatuses 30. In addition, in the one or more communication apparatuses 30, some communication apparatuses 30 can also communicate with each other. For example, two communication apparatuses 30 may communicate with each other by using a sidelink (SL). The communication system may be, for example, a communication system that supports a 2G, 3G, 4G, or 5G (also referred to as new radio (NR) in some cases) access technology, or a wireless fidelity (Wi-Fi) system, or a cellular system related to the 3$^{rd}$ Generation Partnership Project (3GPP), or a communication system that supports convergence of a plurality of wireless technologies, or a future-oriented evolved system.

The following describes some terms in embodiments of this application for ease of understanding by a person skilled in the art.

In embodiments of this application, the communication apparatus is, for example, a terminal device, or a functional module (for example, a chip system or a communication chip) disposed in the terminal device, or may be a part or component having functions of the terminal device, or may be a large device including the terminal device. The terminal device is a device having wireless receiving and sending functions; and may be a fixed device, a mobile device, a handheld device (for example, a mobile phone), a wearable device, a vehicle-mounted device, a roadside unit (RSU), or a wireless apparatus (for example, a communication module, a modem, or a communication chip) embedded in the foregoing device. The terminal device is configured to connect a person, an object, a machine, and the like; and may be widely used in various scenarios. For example, the terminal device includes but is not limited to a terminal device in the following scenarios: cellular communication, device-to-device (D2D) communication, vehicle-to-everything (V2X), machine-to-machine/machine-type communication (M2M/MTC), Internet of things (IoT), virtual reality (VR), augmented reality (AR), industrial control, self-driving, remote medical, a smart grid, smart furniture, smart office, a smart wearable, smart transportation, a smart city, an unmanned aerial vehicle, and a robot. The terminal device may be referred to as user equipment (UE), a terminal, an access station, a UE station, a remote station, a wireless communication device, a user apparatus, or the like in some cases. For ease of description, in embodiments of this application, UE is used as an example of the communication apparatus for description.

Network devices in embodiments of this application include, for example, an access-network device and/or a core-network device. The access-network device is a device having wireless receiving and sending functions, and is configured to communicate with the terminal device. The access-network device includes but is not limited to: a base transceiver station (BTS), a NodeB (NodeB), an evolved NodeB (eNodeB/eNB, or gNodeB/gNB), a transmission reception point (TRP), or a future-evolved base station of the 3$^{rd}$ Generation Partnership Project (3GPP) in the communication system, an access node in a Wireless Fidelity (Wi-Fi) system, a wireless relay node, a wireless backhaul node, or the like. The base station may be a macro base station, a micro base station, a picocell base station, a small cell, a relay station, or the like. A plurality of base stations may support the mentioned networks using a same access technology, or may support the mentioned networks using different access technologies. The base station may include one or more co-site or non-co-site transmission reception points. The network device may be alternatively a radio controller, a central unit (centralized unit, CU), and/or a distributed unit (DU) in a cloud radio access network (CRAN) scenario. In addition, the network device may be a server, a wearable device, a vehicle-mounted device, an RSU, or the like. The following uses an example in which the access-network device is a base station for description. A plurality of network devices in the communication system may be base stations of a same type, or may be base stations of different types. The base station may directly communicate with the terminal device, or may communicate with the terminal device by using a relay station. The terminal device may communicate with a plurality of base stations in different access technologies. The core-network device is configured to implement functions, such as mobility management, data processing, session management, and policy and charging. Names of devices that implement functions of a core network in systems of different access technologies may vary. This is not limited in embodiments of this application. A 5G system is used as an example. The core-network device includes: an access and mobility management function (AMF), a session management function (SMF), a user plane function (UPF), or the like.

In embodiments of this application, the communication apparatus configured to implement functions of a network device may be the network device, or may be an apparatus that can support the network device in implementing the functions, for example, a communication module or a chip system. The apparatus may be installed in the network device. In the technical solutions provided in embodiments of this application, the technical solutions provided in embodiments of this application are described by using an example in which the apparatus configured to implement functions of a network device is the network device.

In the following description, unless otherwise specified, the "network device" is, for example, an "access-network device".

In embodiments of this application, unless otherwise specified, a quantity of nouns indicates "a singular noun or a plural noun", namely, "one or more". "At least one" means one or more, and "a plurality of" means two or more. The term "and/or" describes an association relationship between associated objects, and indicates that one of three relationships may exist. For example, A and/or B may indicate any one of the following three cases: Only A exists, both A and B exist, and only B exists, where A and B may be singular or plural. The character "/" generally indicates an "or" relationship between the associated objects. For example, A/B indicates A or B. "At least one of the following items (pieces)" or a similar expression thereof means any combination of these items, including any combination of singular items (pieces) or plural items (pieces). For example, at least one item (piece) of a, b, or c may indicate: a; b; c; a and b; a and c; b and c; or a, b, and c. Herein, a, b, and c may be singular or plural.

Ordinal numerals such as "first" and "second" in embodiments of this application are used to distinguish between a plurality of objects, and are not intended to limit sizes, content, a sequence, a time sequence, application scenarios, priorities, or importance of the plurality of objects. For example, a first relationship and a second relationship may be a same relationship, or may be different relationships. In addition, such names do not indicate different content, priorities, application scenarios, or degrees of importance of the two relationships.

A transport block encoding procedure and a transport block decoding procedure are involved in embodiments of this application. Therefore, the following first describes the encoding procedure and the decoding procedure.

Figure 2:
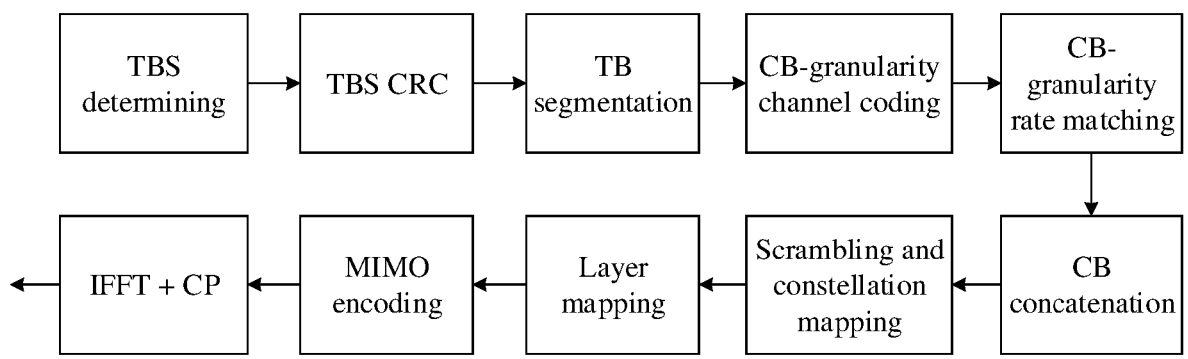
FIG. 2 is a schematic diagram of an example encoding process according to an embodiment of this application.

For example, FIG. 2 shows a schematic diagram of some steps that may be included in the encoding procedure. It can be learned from FIG. 2 that, the encoding procedure may include processes, such as transport block size (TBS) determining, TBS cyclic redundancy check (CRC), TB segmentation, channel coding at a code block (CB) granularity, CB-granularity rate matching, CB concatenation, scrambling and constellation mapping, layer mapping, MIMO encoding, and inverse fast Fourier transform (IFFT)+cyclic prefix (CP). The following describes the steps included in the encoding procedure.

(11) Determine a quantity of information bits (which may also be referred to as a quantity of bits) of a to-be-transmitted transport block, where the quantity of bits of the transport block is a size of the transport block, namely, a TBS of the transport block.

In an NR system, a network device sends uplink and downlink encoding control information to UE by using a downlink control channel (for example, a physical downlink control channel (PDCCH)). The encoding control information includes an MCS, for example, includes an MCS index. For example, if the encoding control information corresponds to a to-be-transmitted transport block, the network device and the UE may determine, based on the MCS and Table 1, a code rate of the transport block. For example, if the MCS index IMcs included in the encoding control information is 0, the network device and the UE may determine that the code rate of the transport block is 120/1024. In addition, the network device may further add demodulation reference signal (DMRS) indication information and redundancy overhead information xOverhead to a radio resource control (RRC) message. Both the network device and the UE may determine a unique TBS based on the foregoing information, for example, determine the TBS of the transport block.

TABLE 1

| MCS index $I_{MCS}$ | Modulation order $Q_m$ | Target code rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

To determine the quantity of bits of the to-be-transmitted transport block, the network device may first determine a quantity of available resource elements (RE) of a physical downlink shared channel (PDSCH) on one physical resource block (PRB). For example, the quantity of the available REs of the PDSCH on one PRB is represented as $N'_{RE}$, and $N'_{RE}$ may meet the following relationship:

$$N'_{RE}=N_{sc}^{RB} \times N_{symb}^{sh}-N_{DMRS}^{PRB}-N_{oh}^{PRB} \quad \text{(Formula 1)}$$

In Formula 1, $N_{sc}^{RB}$ is, for example, equal to 12, indicating that one PRB has 12 sub-carriers; $N_{symb}^{sh}$ represents a quantity of available symbols of the PDSCH in the slot (slot), and the network device generally indicates $N_{symb}^{sh}$ by using downlink control information (DCI); $N_{DMRS}^{PRB}$ represents a quantity of REs occupied by the DMRS in a duration of the PDSCH on the PRB; and $N_{oh}^{PRB}$ represents overheads occupied for sending a pilot on the PDSCH configured by a higher layer, namely, a quantity of REs occupied for sending the pilot on the PDSCH configured by the higher layer. The pilot includes a phase tracking reference signal (PT-RS), and/or a channel-state information reference signal (CSI-RS) or the like. In addition, to restrict a maximum amount of data that can be transmitted in one PRB of each slot, overall available resources on $n_{PRB}$ may be further computed. For example, the overall available resources on $n_{PRB}$ are represented by $N_{RE}$, where $N_{RE}$ is a quantity of available REs in each of v layers. For example, $N_{RE}$=min (156, $N'_{RE}$)$\times n_{PRB}$, where min(x, y) indicates that the smaller value of x and y is selected, and $N_{RE}$ represents a quantity of REs used for data transmission on one PRB in each of the v layers, or in other words, $N_{RE}$ represents the quantity of available REs in each of the v layers. Optionally, for the v layers, all of $N_{RE}$ corresponding to these layers are equal to each other.

After $N_{RE}$ is determined, the quantity of bits of the to-be-transmitted transport block may be determined based on $N_{RE}$. For example, the quantity of bits of the transport block is represented as $N_{info}$. For example, $N_{info}$ meets the following relationship:

$$N_{info}=N_{RE} \times R \times Q_m \times v \quad \text{(Formula 2)}$$

R represents the code rate determined based on the MCS corresponding to the transport block, and $Q_m$ represents a modulation order of the transport block, or in other words, $Q_m$ represents a quantity of bits required for generating a complex number of one RE.

A physical meaning herein is as follows: First, a quantity of REs that can be mapped to each of the v layers (excluding a quantity of REs occupied by a DMRS and some other pilots) is computed; and then $N_{RE} \times Q_m$, namely, a quantity of bits that can be ultimately mapped to each layer, is obtained based on the quantity $Q_m$ of bits required for generating the complex number of one RE. The bits that can be ultimately mapped to each layer include information bits that can be ultimately mapped to each layer and check bits corresponding to the information bits. Considering that R represents the code rate determined based on the MCS corresponding to the to-be-transmitted transport block, the code rate represents a ratio of a quantity of transmitted information bits in one information transmission to a first sum value, where the first sum value is a sum of the quantity of the information bits and a quantity of the check bits. In other words, R represents a ratio of the quantity of information bits of the transport block to a total quantity of bits that can be carried in the v layers. Then a quantity of bits of the transport block transmitted in each of the v layers is $N_{RE} \times R \times Q_m$. For the total quantity of information bits that can be transmitted in the v layers, refer to Formula 2. It is worth noting that, herein it cannot be ensured that $N_{info}$ is an integer. However, in the encoding procedure, the to-be-transmitted transport block may need to be segmented. For example, the transport block is segmented into a plurality of CBs. To adapt to a segmentation process, $N_{info}$ needs to be further rounded. A rounding manner is not limited. For example, refer to a manner of rounding a quantity of bits of a transport block in a conventional encoding process.

(12) Perform CRC on the to-be-transmitted transport block, that is, the TB CRC shown in FIG. 2.

The network device may generate check bits based on a CRC generator polynomial. The check bits may be used by the UE to determine, after decoding of information received by the UE is completed, whether the decoding succeeds.

(13) Segment the to-be-transmitted transport block, that is, perform the TB segmentation shown in FIG. 2.

Generally, a channel coding gain can be obtained by increasing a length of a transport block. However, if a transport block is excessively long, a channel coding gain obtained by increasing the length slows down, that is, the channel coding gain obtained by increasing the length of the transport block is small. In addition, because the transport block is excessively long, a hardware requirement for encoding/decoding the transport block is higher. For example, a corresponding delay and a buffer size need to be met, and corresponding computing complexity is also high. In addition, when a transport block is encoded as a whole, if an error occurs at a receive end of the transport block in decoding some bits and the error cannot be corrected, the entire transport block needs to be retransmitted at a transmit end of the transport block. Consequently, transmission overheads are large, and a transmission delay also increases. Therefore, a function of segmenting a TB into CBs is introduced. In a subsequent channel coding process, channel coding is performed at a granularity of a CB. For the receive end, channel decoding may be performed also at a granularity of a CB. Because the length is reduced, the hardware requirement can be lowered. If some CBs are incorrectly decoded at the receive end, only these CBs need to be retransmitted at the transmit end, and the entire TB does not need to be retransmitted, thereby reducing the transmission overheads and shortening the transmission delay. To enable the receive end to determine whether each CB is successfully decoded, check bits may be added at the transmit end to each CB.

Low density parity check (LDPC) encoding is used as an example. There are two code generator polynomials for LDPC encoding. For example, $K_{cb}$ is used to represent a maximum CB size. For a first generator polynomial, $K_{cb}$=8448; and for a second generator polynomial, $K_{cb}$=3840. A first transport block is a bit sequence. For example, a length of the bit sequence is B, and the bit sequence may be represented as $b_0, b_1, b_2, b_3, \ldots, b_{B-1}$.

If $B \leq K_{cb}$, a quantity of CBs included in the to-be-transmitted transport block is 1, and the CB is the transport block itself.

If $B > K_{cb}$, the to-be-transmitted transport block may be segmented into a plurality of CBs, and lengths of the plurality of CBs may be kept as being equal to each other as possible in a segmentation process. For example, the length is represented as K. For example, the quantity of CBs included in the to-be-transmitted transport block is represented as C, where C=|B/($K_{cb}$–L)|, L represents a length of check bits of one CB, and a length of check bits of each CB included in the transport block is, for example, equal to each other. A length of a bit sequence output by the network device after performing channel coding on one CB is, for example, represented as B', where B'=B+C×L. One CB included in the to-be-transmitted transport block may also be represented as a bit sequence. The bit sequence is, for example, represented as $c_{r0}, c_{r1}, c_{r2}, \ldots, c_{r(K-1)}$, where r is an integer greater than or equal to 0 and less than C. For example, a bit sequence of a first CB included in the to-be-transmitted transport block is represented as $c_{00}, c_{01}, c_{02}, \ldots, c_{0(K-1)}$, and a bit sequence of a second CB included in the transport block is represented as $c_{10}, c_{11}, c_{12}, \ldots, c_{1(K-1)}$.

(14) Perform channel coding separately on the CBs included in the to-be-transmitted transport block, that is, the CB-granularity channel coding shown in FIG. 2.

If the to-be-transmitted transport block is segmented into the plurality of CBs in the step (13), the step (14) may be performed; or if the to-be-transmitted transport block is not segmented in the step (13), the step (14) may be replaced with: performing channel coding on the to-be-transmitted transport block; or even if the to-be-transmitted transport block is not segmented in the step (13), the step (14) may still be understood as performing channel coding on a unique CB included in the to-be-transmitted transport block. A channel coding process is similar, regardless of whether channel coding is performed on the CBs or on the to-be-transmitted transport block.

In a process of information transmission by using a channel, due to a factor such as bit fading or noise impact, a bit error may occur in information received at the receive end, as compared with original information sent at the transmit end. Therefore, a channel coding mechanism is introduced to establish specific relationships between bits. The relationships are used at the receive end to determine whether a decoding result is correct, or used at the receive end to correct a bit that is incorrectly transmitted, to expect to obtain a correct decoding result. For example, in an LTE system, data may be encoded based on a concatenated code (turbo) encoder; or in an NR system, data may be encoded based on an LDPC encoder. Details are not described herein in embodiments of this application.

(15) Perform rate matching separately on the CBs included in the to-be-transmitted transport block.

An objective of the rate matching is to make a length of bits output after the channel coding match a length of bits to be actually sent in the plurality of layers used to send the transport block. For example, a code rate in LDPC encoding is related to a generator polynomial for the LDPC encoding. When the generator polynomial for the LDPC encoding is fixed, the LDPC encoding is performed at a fixed code rate, and the length of the bits output after the channel coding is performed on the transport block may be greater than the length of the bits to be actually sent in the plurality of layers used to send the transport block, or may be exactly equal to the length of the bits to be actually sent in the plurality of layers used to send the transport block, or may be less than the length of the bits to be actually sent in the plurality of layers used to send the transport block. Based on various relationships between a length of bits to be actually sent in the plurality of layers used to send one transport block and LDPC encoding lengths, a corresponding method may be used to enable the length of the bits output after the channel coding to match the length of the bits to be actually sent in the plurality of layers used to send the transport block.

If the to-be-transmitted transport block is segmented into the plurality of CBs in the step (13), the step (15) may be performed; or if the to-be-transmitted transport block is not segmented in the step (13), the step (15) may be replaced with: performing rate matching on the to-be-transmitted transport block. Alternatively, even if the to-be-transmitted transport block is not segmented in the step (13), the step (15) may still be understood as performing rate matching on a unique CB included in the to-be-transmitted transport block. A rate matching process is similar, regardless of whether rate matching is performed on the CBs or on the to-be-transmitted transport block. In the following description process, rate matching on the CBs is used as an example.

Rate matching on a CB roughly includes several steps, which are separately described below. In the following description process, rate matching on a CB 1 is used as an example, where the CB 1 is a CB included in the to-be-transmitted transport block. For example, the CB 1 is any CB included in the first transport block.

In a first step, $E_r$ is determined, where $E_r$ is a quantity of output bits corresponding to the rate matching of the CB 1, or in other words, $E_r$ is a quantity of bits output after the rate matching is performed on the CB 1. $E_r$ may be regarded as an expected quantity of bits to be output after the rate matching is performed on the CB 1.

For example, when j meets $$j \le C' - \mathrm{mod}\left(\frac{G}{v \times Q_m}, C'\right) - 1, E_r = v \times Q_m \times \left\lfloor \frac{G}{v \times Q_m \times C'} \right\rfloor;$$

or
when j does not meet $$j \le C' - \mathrm{mod}\left(\frac{G}{v \times Q_m}, C'\right) - 1, E_r = v \times Q_m \times \left\lceil \frac{G}{v \times Q_m \times C'} \right\rceil,$$

where $\lfloor x \rfloor$ represents rounding down x, $\lceil x \rceil$ represents rounding up x, j represents a sequence number of the CB 1 in the CBs included in the to-be-transmitted transport block, and C' represents a quantity of effectively transmitted CBs in the to-be-transmitted transport block. For example, during initial transmission or when CBG retransmission is not supported, C'=C; or if the encoding control information sent by the network device and corresponding to the to-be-transmitted transport block indicates that CBG retransmission is supported, C' represents a quantity of to-be-transmitted CBs in the transport block. $Q_m$ represents a modulation order of the to-be-transmitted transport block. G represents a total quantity of bits used for transmission of the to-be-transmitted transport block, or in other words, G represents a total quantity of bits actually mapped to the transport block, and G may be determined based on a quantity of REs actually occupied in a resource transmission process. For example, $G=N_{RE} \times v \times Q_m$, where $N_{RE}$ represents the quantity of available REs in each of the v layers.

It can be learned from the foregoing formulas that, for example, the to-be-transmitted transport block includes a plurality of CBs, and If G' cannot be evenly divided by C', a quantity of bits that are of a previous CB included in the to-be-transmitted transport block and are output after the rate matching may be enabled to be less than a quantity of bits that are of a subsequent CB included in the to-be-transmitted transport block and are output after the rate matching. Herein, "previous" and "subsequent" are related to a value of j. For example, if $$j \le C' - \mathrm{mod}\left(\frac{G}{v \times Q_m}, C'\right) - 1,$$

a corresponding CB may be considered as a previous CB included in the to-be-transmitted transport block; or if $$j > C' - \mathrm{mod}\left(\frac{G}{v \times Q_m}, C'\right) - 1,$$

a corresponding CB may be considered as a subsequent CB included in the to-be-transmitted transport block.

$$\frac{G}{v \times Q_m}$$

represents a quantity of modulation symbols of each of the v layers, and mod $$\left(\frac{G}{v \times Q_m}, C'\right)$$

represents a remainder obtained after modulation symbols of a layer of the v layers are evenly distributed. To minimize an output difference between the CBs, one more modulation symbol (or one RE) is allocated to some CBs (for example, the subsequent CB included in the to-be-transmitted transport block) in each layer, and then a total of v more modulation symbols are allocated to these CBs (for example, the subsequent CB included in the to-be-transmitted transport block) in the v layers.

In a second step, bit screening is performed on the CB 1.

Figure 3:
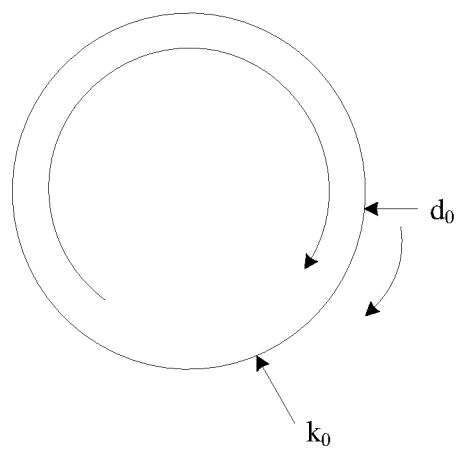
FIG. 3 is a schematic diagram of an example bit screening process.

For example, bits output after the channel coding is performed on the CB 1 may be buffered as a cycle. Based on a redundancy version (RV) for the encoding, a start position $k_0$ of the bit screening may be determined. In the buffered output bits after the channel coding of the CB 1, corresponding bits are sequentially fetched starting from $k_0$. Refer to FIG. 3, which is a schematic diagram of bit screening. An outer circle in the figure represents the buffered output bits of the CB 1 after the channel coding, and an inside arrow represents a process of fetching bits from the buffered bits. For example, after the channel coding is performed on the CB 1, $d_i$ bits are output; and the $d_i$ bits may be filled into a buffer starting from a position do, as shown by an outermost arrow in FIG. 3. For example, if $E_r$ is determined in the first step, $E_r$ bits in the buffer are sequentially output from the position $k_0$. In this way, bit screening for the CB 1 is completed.

In a process of fetching the bits from the buffer, for example, if $d_{(k_0+j) \bmod N_{cb}} \neq$ null, $e_k = d_{(k_0+j) \bmod N_{cb}}$, where null represents an invalid bit, $N_{cb}$ represents a length of the bits output after the channel coding is performed on the CB 1, j represents a step value for use when the bits are fetched, $e_k$ represents a $k^{th}$ bit fetched from the buffer, and $d_{(k_0+j) \bmod N_{cb}}$ represents a $(k_0+j)^{th}$ bit in the buffer. As represented by the foregoing formula, in a process of fetching a bit, if a bit is not an invalid bit, the bit is a valid bit and then the bit may serve as a bit output after the bit screening.

In a third step, bit interleaving is performed on the CB 1, or in other words, bit interleaving is performed on the bits output after the bit screening is performed on the CB 1.

The bit interleaving is implemented, for example, in the following manner:

$$f_{s+w \times Q_m} = e_{s \times \frac{E_r}{Q_m} + w} \qquad \text{(Formula 3)}$$

For example, a bit sequence output after the bit screening is performed on the CB 1 is represented as $e_0, e_1, e_2, \ldots, e_{E_r-1}$, and the bit interleaving is performed on the bit sequence, that is, the bit sequence is converted into $f_0, f_1, f_2, \ldots, f_{E_r-1}$ based on Formula 3, where s is an integer from 0 to $Q_m$, and w is an integer from 0 to $$\frac{E_r}{Q_m} - 1.$$

After the foregoing three steps are taken, the rate matching on the CB 1 is completed. A manner of rate matching on each effectively transmitted CB in the first transport block is similar. For details, refer to the description of the rate matching process of the CB 1.

(16) Concatenate the bits output after the effectively transmitted CBs in the to-be-transmitted transport block undergone the rate matching, that is, perform the CB concatenation shown in FIG. 2.

There may be a plurality of effectively transmitted CBs in the to-be-transmitted transport block. The network device performs rate matching on each CB. One bit sequence may be output after rate matching is performed on one CB. After rate matching is performed on the plurality of CBs, a plurality of bit sequences may be output. In this case, the network device may concatenate the plurality of bit sequences together. For example, the network device may sequentially concatenate the plurality of bit sequences together based on indexes of the CBs included in the to-be-transmitted transport block. For example, a bit sequence obtained after the concatenation is referred to as a bit sequence 1.

(17) Perform scrambling and constellation mapping on the bit sequence 1, that is, the scrambling and constellation mapping shown in FIG. 2.

The network device scrambles the bit sequence 1, for example, performs exclusive OR processing on each bit included in the bit sequence 1 by using a pseudo-random sequence. The scrambling enables occurrence of bits whose values are "1" and "0" to be randomized, so that there is equal probability of mapping of these bits to each constellation point. In this way, a time-domain peak-to-average ratio can be minimized. In addition, physical layer encryption can also be implemented through the scrambling. For example, a scrambling sequence used for the scrambling is configured by the network device, and configuration information used to configure the scrambling sequence is private, thereby providing an encryption function to some extent.

The constellation mapping is to encode bits obtained after the bit sequence 1 is scrambled, to generate complex number information, or in other words, generate a complex number encoding symbol (which may also be referred to as an encoding symbol for short). For example, a total of at least one encoding symbol is generated, and the at least one encoding symbol can be transmitted in a radio wave. To be concise, the radio wave may be represented in two dimensions: an amplitude and a phase, that is, may be represented by using a real part and an imaginary part of a complex number. It can be learned that, the essence of the constellation mapping is to generate complex number information based on corresponding bits.

(18) Perform layer mapping on the at least one encoding symbol.

The layer mapping is to map the at least one encoding symbol to the v layers for transmission. In an NR system, one transport block may be mapped to a maximum of four layers. For a mapping scheme, refer to Table 2, where $d^{(q)}(0), \ldots, d^{(q)}(M_{symb}^{(q)}-1)$ represents $M_{symb}^{(q)}$ complex encoding symbols of a $q^{th}$ transport block (or, codeword (code word)), namely, encoding symbols output after the constellation mapping. These encoding symbols are mapped to the v layers, and are denoted as $x(i)=[x^{(0)}(i) \ldots x^{(v-1)}(i)]^T$, where $i=0, 1, \ldots, M_{symb}^{(q)}-1$. It can be learned that, the encoding symbols of the transport block are evenly mapped to each layer. In other words, each layer has a same code rate, which is equal to the code rate indicated by the MCS corresponding to the transport block. Code rate=TBS/ (Quantity of REs in each layer×$Q_m$×v).

TABLE 2

| Number of layers | Number of codewords (Number of codewords) | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = \frac{M_{symb}^{(0)}}{2} = \frac{M_{symb}^{(1)}}{3}$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = \frac{M_{symb}^{(0)}}{3} = \frac{M_{symb}^{(1)}}{3}$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = \frac{M_{symb}^{(0)}}{3} = \frac{M_{symb}^{(1)}}{4}$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = \frac{M_{symb}^{(0)}}{4} = \frac{M_{symb}^{(1)}}{4}$ |

In Table 2, $M_{symb}^{layer}$ represents a total quantity of complex encoding symbols of a transport block (or a code word (code word)). For example, for the $q^{th}$ transport block, $M_{symb}^{layer}$ of the transport block is also represented as $M_{symb}^{(q)}$.

(19) Map a layer mapping result to an antenna, that is, perform the MIMO encoding shown in FIG. 2. Details about the process are not described herein again.

(110) Perform IFFT on MIMO-encoded information and add a CP, that is, perform the IFFT+CP shown in FIG. 2.

A function of the IFFT is to change the MIMO-encoded information from frequency domain to time domain, to obtain an effect of orthogonal frequency domain multiplexing (orthogonal frequency division multiplexing, OFDM), so that different information can be transmitted in different frequency domain space. The CP is a guard interval between different OFDM symbols, to reduce interference between the OFDM symbols.

In this case, the encoding procedure of the to-be-transmitted transport block is completed, and an encoded transport block is obtained. The network device may send the encoded transport block to the UE. For the UE, for example, a received signal is referred to as a signal 1.

The foregoing describes the process of encoding a transport block, and the following describes a process of decoding the encoded transport block at the receive end (for example, the UE).

Figure 4:
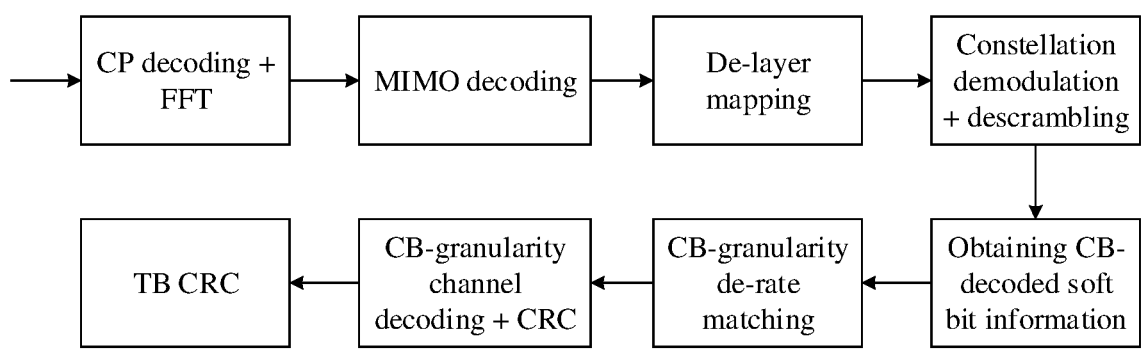
FIG. 4 is a schematic diagram of an example decoding process according to an embodiment of this application.

FIG. 4 shows a schematic diagram of some steps that may be included in a decoding procedure. It can be learned from FIG. 4 that, the decoding procedure may include processes such as, CP decoding+fast Fourier transform (FFT), MIMO decoding, de-layer mapping, constellation demodulation+descrambling, obtaining CB-decoded soft bit information, CB-granularity de-rate matching, CB-granularity channel decoding+CRC, and TB CRC. The following describes the corresponding steps shown in FIG. 4.

(aa) Determine a quantity of bits of a transport block corresponding to a signal 1. The transport block corresponding to the signal 1 is, for example, referred to as a transport block 1, and the transport block 1 is a transport block obtained by the UE in a process of decoding the signal 1.

In an ideal case, the transport block 1 is the same as the to-be-transmitted transport block in the encoding procedure. A quantity of bits of the transport block 2 is a size of the transport block 2, namely, a TBS of the transport block 2.

The UE determines the quantity of bits of the transport block corresponding to the signal 1. For a determining manner, for example, refer to the step (11) in the encoding procedure.

(ab) Perform CP decoding and FFT on the signal 1, that is, the CP decoding+FFT shown in FIG. 4.

The step (ab) may be considered as a process inverse to the step (110) in the encoding procedure, and a main objective is to remove the CP in time domain, and transform the received signal from time domain to frequency domain. For example, information obtained after the CP decoding and FFT are performed on the signal 1 is referred to as information 1.

(ac) Perform MIMO decoding on the information 1, that is, the MIMO decoding shown in FIG. 4. The step (ac) may be considered as a process inverse to the step (19) in the encoding procedure.

After a signal sent by the network device is transmitted through a channel, orthogonality of the signal changes, and intentional interference (active interference) or unintentional interference (passive interference caused by channel pollution) occurs. To obtain an original signal for multi-layer transmission, the UE may perform interference cancellation and noise cancellation by using a receiver. Typical receivers include minimum mean square error (MMSE) receivers, maximum a posteriori (MAP) receivers, and the like. In an ideal case (for example, in a case in which there is no interference or no noise), outputs of the MIMO decoding are outputs of the layer mapping at the transmit end. For example, an output result of the step (c) is the same as an output result of the step (9) in the encoding procedure.

(ad) Perform de-layer mapping on MIMO-decoded information, that is, the de-layer mapping shown in FIG. 4.

A process of the de-layer mapping by the UE may be considered as a process inverse to the process of the layer mapping by the network device, that is, the step (ad) may be considered as a process inverse to the step (18) in the encoding procedure. The UE may obtain a demodulation symbol of each of the v layers based on the MIMO decoding process, and combine the demodulation symbols of each of the v layers. The UE may output ultimate demodulation symbols of all of the v layers in a sequential manner, to obtain a demodulation symbol sequence. In an ideal case, the demodulation symbol sequence output by the UE is the same as the encoding symbol sequence determined by the network device in the encoding procedure. Therefore, it may also be considered that the UE outputs an encoding symbol sequence, where the encoding symbol sequence may include at least one encoding symbol.

(ae) Perform constellation de-mapping and descrambling on the at least one encoding symbol, that is, the constellation de-mapping+descrambling shown in FIG. 4.

The constellation de-mapping is a process of determining bit information based on the at least one encoding symbol. In an ideal case, bits obtained after the constellation de-mapping is performed on the at least one encoding symbol may be the same as the bits obtained after the bit sequence 1 is scrambled in the encoding procedure. The descrambling is descrambling the bits obtained after the constellation de-mapping is performed on the at least one encoding symbol, and a descrambling process is inverse to the process of scrambling the bit sequence 1 in the encoding procedure. For example, information obtained by descrambling the bits that are obtained after the constellation de-mapping is performed on the at least one encoding symbol is referred to as a bit sequence 2. In an ideal case, the bit sequence 1 and the bit sequence 2 are the same.

(af) Obtain decoded bits of each effectively transmitted CB in the transport block 2 corresponding to the signal 1, that is, the decoded soft bit information at a CB granularity obtained in FIG. 4. The step (af) may be considered as a process inverse to the step (16) in the encoding procedure.

For example, the UE may determine a quantity of the decoded bits corresponding to each effectively transmitted CB in the transport block 2, to determine, from the bit sequence 2, the decoded bits corresponding to each effectively transmitted CB in the transport block 2. For example, for a CB 1, a corresponding quantity of decoded bits is $E_r$, where $E_r$ is a same feature as $E_r$ in the embodiment shown in FIG. 3. For a manner of determining $E_r$ by the UE, refer to the embodiment shown in FIG. 3.

(ag) Perform de-rate matching on each effectively transmitted CB in the transport block 2. The step (ag) may be considered as a process inverse to the step (15) in the encoding procedure.

The UE has determined the decoded bits corresponding to each effectively transmitted CB in the second transport block, and may further perform de-rate matching for the decoding corresponding to each CB.

For example, N represents a quantity of output bits of one CB after the channel coding is performed. If a quantity of decoded bits corresponding to one CB is greater than N, this is equivalent to that, a sent signal includes repetitive (namely, duplicate) information, and then the UE simply adds the same information together. If the quantity of decoded bits corresponding to one CB is less than or equal to N, the decoded bits corresponding to the CB need to be sequentially padded to corresponding positions of N, and an information position (namely, a remaining position in the N positions other than the positions padded with the decoded bits) that is matched at the transmit end of the signal 1 may be padded with a corresponding value. Specific padding information is related to an encoding scheme or an algorithm, and is not specifically described herein.

(ah) Perform decoding and CRC on each effectively transmitted CB in the transport block 2, that is, the CB-granularity channel decoding+CRC shown in FIG. 4. The step (ah) may be considered as a process inverse to the step (14) in the encoding procedure.

($a_i$) Perform CRC on the transport block 2, that is, the TB CRC shown in FIG. 4.

After the decoding and the CRC are separately performed on each effectively transmitted CB in the transport block 2 corresponding to the signal 1, the CBs may be combined to obtain the transport block 2. After obtaining the transport block 2, the UE may perform CRC on the transport block 2, to determine whether the transport block 2 has been correctly transmitted. In this case, the process of decoding the signal 1 by the UE is completed.

The foregoing describes the encoding procedure and the decoding procedure, and the following describes a concept of spectral efficiency.

The spectral efficiency indicates a quantity of bits transmitted on a unit bandwidth in a unit time. It is generally represented in bits/s/Hz. It can be learned from a Shannon theorem $$C = B \times \log_2\left(1 + \frac{S}{N}\right)$$

that, a quantity C of bits that can be transmitted on a bandwidth B is positively correlated with an SINR of a received signal, where the SINR is determined by received power S of the signal and noise power N. Therefore, the quantity of information bits that can be transmitted on the bandwidth B increases as the signal to interference plus noise ratio is higher.

C is a theoretical quantity of transmitted information bits that can be attained based on the SINR, and an objective of a communication technology is to approach the Shannon limit C. In an actual communication system, a quantity of actually sent bits is generally determined based on the SINR. The quantity of actually sent bits is, for example, C', and generally, C'<C. An indicator of the spectral efficiency may be represented by C'/B. In the actual communication system, a code rate may be alternatively used to represent the spectral efficiency: $CR=C'/(N_{RE} \times Q_m)$, where CR represents the code rate, $N_{RE}$ represents a quantity of REs used for data transmission on the bandwidth B in a unit time (for example, the unit time is a slot), and $Q_m$ represents a quantity of bits that can be carried on each RE. If the quantity C' of actually sent bits is small, an SINR of a channel required for correctly transmitting the C' bits is low.

Figure 5A:
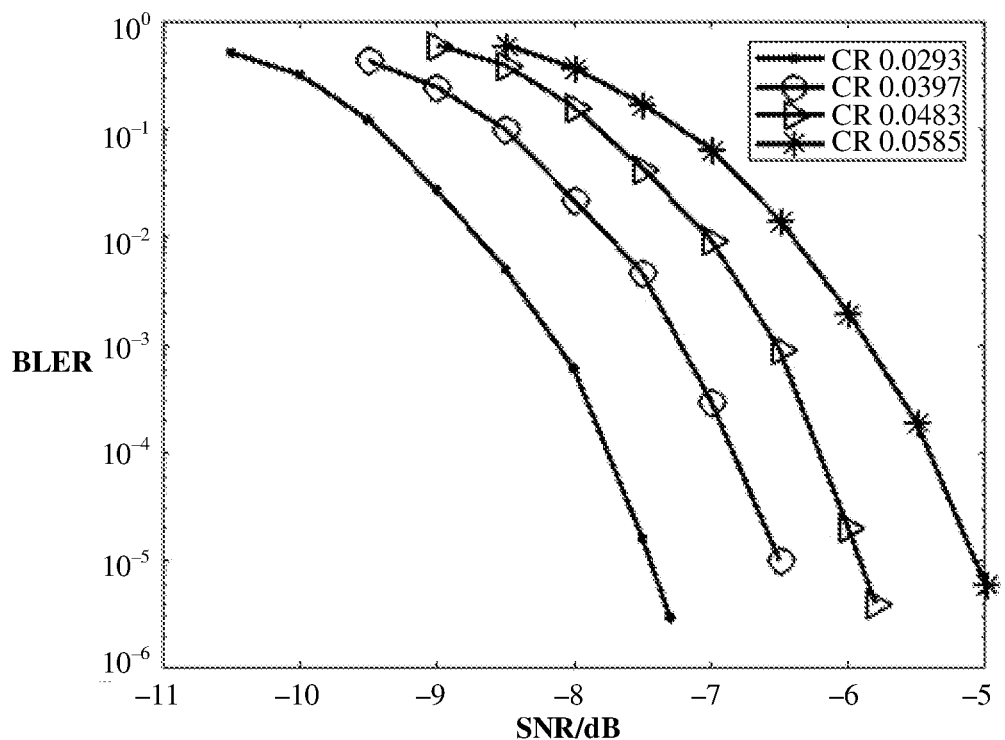
FIG. 5A is a schematic diagram of an example relationship between an SINR and a BLER.

As shown in FIG. 5A, information is transmitted on a fixed physical resource at different code rates. A smaller C' indicates a lower code rate. In FIG. 5A, an additive white Gaussian noise (AWGN) channel is used as an example. In addition, in FIG. 5A, a vertical axis represents a BLER, and a horizontal axis represents an SINR in a unit of dB. A first line, a second line, and a third line on the left are used as an example. When the SINR is equal to −9 dB and the information is transmitted at a code rate of 0.0293, a block error rate (BLER) that can be obtained is 0.03, and a quantity of bits that can be correctly transmitted in a unit time is $(1-0.03) \times N_{RE} \times Q_m \times 0.0293 = 0.028421 \times N_{RE} \times Q_m$; or when the information is transmitted at a code rate of 0.0397, a BLER that can be obtained is 0.25, and a quantity of bits that can be correctly transmitted in a unit time is $(1-0.25) \times N_{RE} \times Q_m \times 0.0397 = 0.029775 \times N_{RE} \times Q_m$; or when the information is transmitted at a code rate of 0.0483, a BLER that can be obtained is 0.6, and a quantity of bits that can be correctly transmitted in a unit time is $(1-0.6) \times N_{RE} \times Q_m \times 0.0483 = 0.01932 \times N_{RE} \times Q_m$. It can be learned from the foregoing description that, when the SINR is equal to −9 dB and the transmission is performed at the code rate of 0.0397, both throughput and spectral efficiency that can be obtained are the highest. If the SINR is not equal to −9 dB, the transmission is performed at the code rate of 0.0397 and then high spectral efficiency may fail to be obtained.

Currently, a code rate of a TB mapped to each layer is the same, and is equal to a code rate of the TB that is determined based on an MCS. However, for the receive end of the TB, a corresponding SINR may vary when the receive end performs receiving in each layer. It can be learned from the foregoing description that, this may cause a failure of some or all of the layers to obtain high spectral efficiency, thereby affecting transmission quality of these layers.

Considering that the corresponding SINR may vary when the receive end performs receiving in each layer, in embodiments of this application, an adjustment factor is specified respectively for each layer in MIMO, and a code rate of a corresponding layer can be adjusted by using an adjustment factor, so that code rates of the layers may be different. In this way, the code rate may match the SINR as much as possible. For example, in a case in which a value of an SINR of a specific layer is fixed, a code rate of the layer may be adjusted by using an adjustment factor of the layer, so that maximum spectral efficiency can be obtained when transmission is performed in the layer by using the code rate. In this manner, some or all of the layers can achieve high spectral efficiency as much as possible, thereby improving transmission quality of these layers.

Figure 5B:
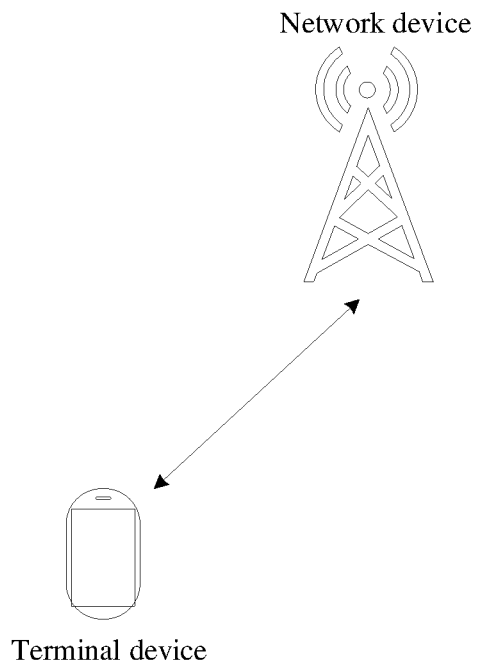
FIG. 5B is a schematic diagram of an example application scenario according to an embodiment of this application.

FIG. 5B shows an example communication network architecture in a communication system 10 according to an embodiment of this application. All subsequently provided embodiments are applicable to the architecture. A network device included in FIG. 5B is, for example, an access-network device 20 included in the communication system 10; and a terminal device included in FIG. 5B is, for example, a communication apparatus 30 included in the communication system 10. The network device and the terminal device can communicate with each other.

Figure 5C:
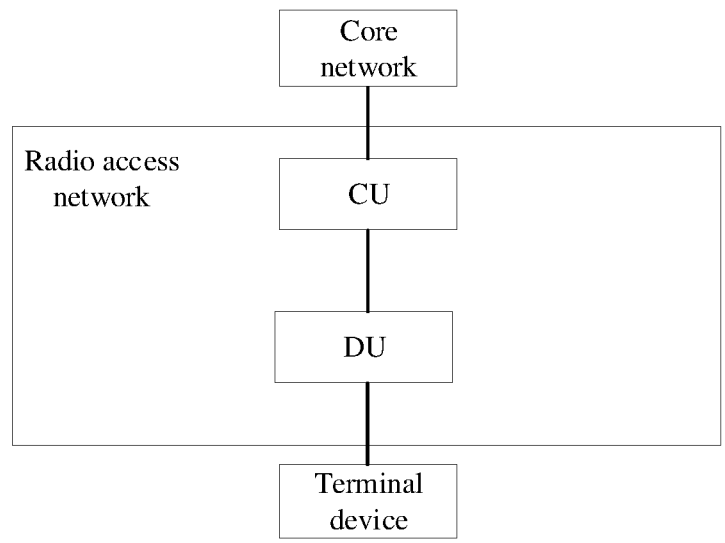
FIG. 5C is a schematic diagram of another example application scenario according to an embodiment of this application.

FIG. 5C shows another example communication network architecture in a communication system 10 according to an embodiment of this application. As shown in FIG. 5C, the communication system includes a core network (new core, CN) and a radio access network (RAN). A network device (for example, a base station) in the RAN is, for example, an access-network device 20 in the communication system 10. A network device in the RAN includes a baseband apparatus and a radio frequency apparatus. The baseband apparatus may be implemented by one or more nodes. The radio frequency apparatus may be independently implemented and remotely disposed from the baseband apparatus, or may be integrated into the baseband apparatus, or a part of the radio frequency apparatus is remotely disposed from the baseband apparatus and a remaining part is integrated into the baseband apparatus. The network device in the RAN may include a CU and a DU. If there are a plurality of DUs, the plurality of DUs may be controlled by one CU in a centralized manner. The CU and the DU may be divided based on wireless-network protocol layer functions that the CU and the DU have. For example, functions of a packet data convergence protocol (PDCP) layer and a protocol layer above the PDCP layer are deployed on the CU, and functions of protocol layers below the PDCP layer, such as a radio link control (RLC) layer and a media access control (MAC) layer, are deployed on the DU. It needs to be noted that the protocol layer division is merely an example, and there may be other division of the protocol layers. The radio frequency apparatus may be disposed remotely from the DU but not in the DU, or may be integrated into the DU, or a part of the radio frequency apparatus is disposed remotely from the DU and a remaining part is integrated into the DU. This is not limited in this embodiment of this application.

Figure 5D:
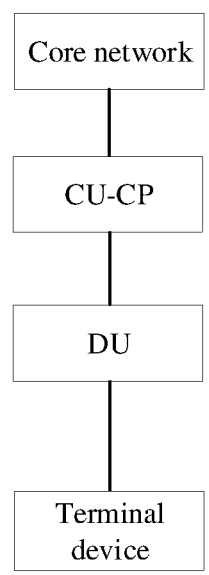
FIG. 5D is a schematic diagram of still another example application scenario according to an embodiment of this application.

FIG. 5D shows still another example communication network architecture in a communication system 10 according to an embodiment of this application. Compared with the architecture shown in FIG. 5C, a control plane (CP) and a user plane (UP) of a CU may be separated and implemented as different entities: a control plane CU entity (CU-CP entity) and a user plane CU entity (CU-UP entity). In this network architecture, signaling generated by the CU may be sent to a terminal device by using a DU, or signaling generated by the terminal device may be sent to the CU by using the DU. The DU may transparently transmit the signaling to the terminal device or the CU by directly encapsulating the signaling in a protocol layer without parsing the signaling. In this network architecture, the CU is classified as a network device on a RAN side, or the CU may be classified as a network device on a CN side. This is not limited in this embodiment.

The following describes the methods provided in embodiments of this application with reference to the accompanying drawings. In the accompanying drawings corresponding to embodiments of this application, steps represented by dashed lines are all optional. The methods provided in embodiments of this application are performed by, for example, a first communication apparatus and a second communication apparatus. The first communication apparatus is, for example, a transmit end of a transport block. Therefore, the first communication apparatus needs to perform an encoding procedure on the transport block. The encoding procedure performed by the first communication apparatus is described subsequently in an embodiment shown in FIG. 6. The second communication apparatus is, for example, a receive end of a transport block. Therefore, the second communication apparatus may receive an encoded transport block, and perform a decoding procedure on the encoded transport block. The decoding procedure performed by the second communication apparatus is described subsequently in an embodiment shown in FIG. 7. The first communication apparatus is, for example, a network device, or a communication chip configured in the network device, or a large device including the network device. The second communication apparatus is, for example, a terminal device, or a communication chip configured in the terminal device, or a large device including the terminal device. Alternatively, the first communication apparatus is, for example, a terminal device, or a communication chip configured in the terminal device, or a large device including the terminal device. The second communication apparatus is, for example, a network device, or a communication chip configured in the network device, or a large device including the network device.

Figure 6:
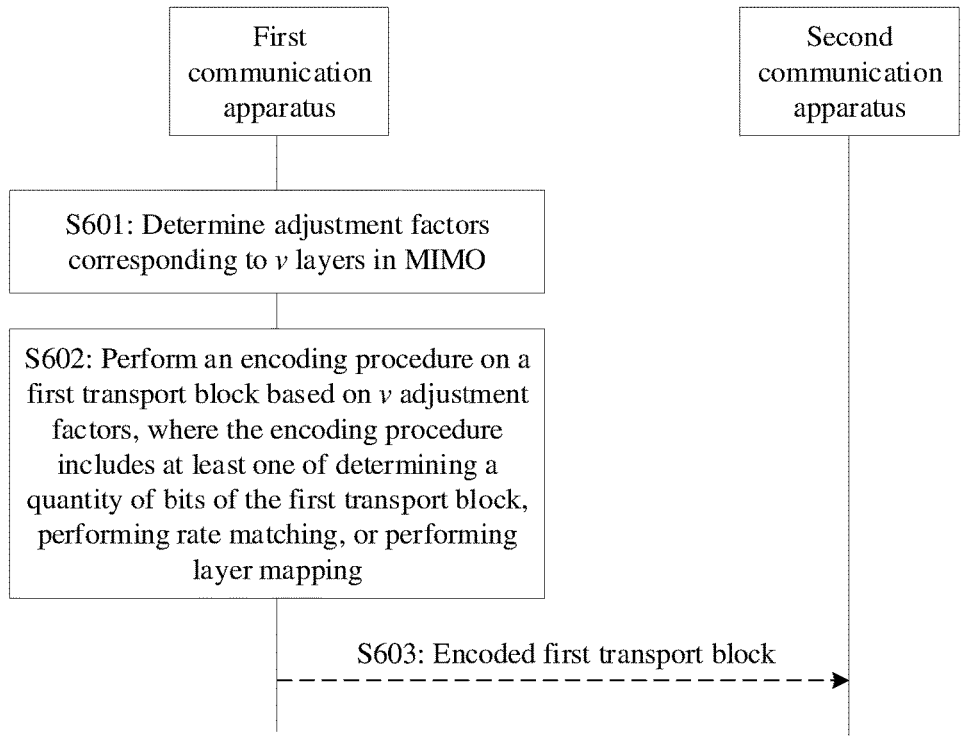
FIG. 6 is a flowchart of an example communication method according to an embodiment of this application.

FIG. 6 shows a flowchart of an example communication method according to an embodiment of this application.

S601: A first communication apparatus determines adjustment factors corresponding to v layers in MIMO, where v is, for example, an integer greater than 1.

One layer corresponds to one adjustment factor, that is, a one-to-one correspondence exists between the layer and the adjustment factor. Therefore, the first communication apparatus determines a total of v adjustment factors for the v layers. The "adjustment factor" is only a name of the feature, or the feature may have another name, for example, the feature is referred to as "factor", or referred to as "information", and the name does not constitute a limitation on the feature.

For example, a value of any one of the v adjustment factors may be greater than 0 and less than or equal to 1. In this way, code rates of the v layers are all enabled to fall within a range of a code rate determined based on a modulation and coding scheme (MCS). The MCS is an MCS corresponding to a first transport block, and the code rate determined based on the MCS is considered as a code rate of the first transport block. To be distinguished from the code rate determined based on the MCS, in this embodiment, a code rate corresponding to a layer may be referred to as a code rate, or may be referred to as an equivalent code rate, or may be referred to as a layer code rate, or the like. The code rate corresponding to a layer may also be considered as a code rate determined based on an adjustment factor of the layer. However, actually, both a "code rate" and a "layer code rate" are code rate concepts. The code rate determined based on the MCS corresponds to a transport block, but a layer code rate corresponds to a layer. In embodiments of this application, "transport block" and "codeword" may be considered as a same concept, and the two are interchangeable. For example, the first transport block may also be referred to as a first codeword.

The first communication apparatus needs to determine an adjustment factor corresponding to a layer. A determining manner is: determining the adjustment factor corresponding to the layer based on channel state information corresponding to the layer. If this determining manner is used, the first communication apparatus needs to first obtain channel state information respectively corresponding to the v layers. Optionally, the first communication apparatus may measure channel states respectively corresponding to the v layers, to obtain the channel state information respectively corresponding to the v layers, where one layer corresponds to one piece of channel state information; and the first communication apparatus may obtain v pieces of channel state information. Alternatively, optionally, a second communication apparatus may measure the channel states respectively corresponding to the v layers, to obtain the channel state information respectively corresponding to the v layers, where one layer corresponds to one piece of channel state information; and then the second communication apparatus may obtain the v pieces of channel state information, and the second communication apparatus sends the v pieces of channel state information to the first communication apparatus, so that the first communication apparatus obtains the v pieces of channel state information. For example, the first communication apparatus is a network device, and the second communication apparatus is UE. In this case, the UE may measure the channel states of the v layers to obtain a CQI, where the CQI may indicate the channel states of the v layers, or in other words, the CQI may include the channel state information of the v layers; and the UE may send the CQI to the first communication apparatus. Alternatively, the UE measures the channel states of the v layers, and may obtain v CQIs, where one CQI indicates a channel state of one layer, or in other words, one CQI includes channel state information of one layer; and the UE may send the v CQIs to the first communication apparatus.

Alternatively, the v adjustment factors may be pre-configured in the first communication apparatus, or predefined in a protocol, so that the first communication apparatus does not need to perform the measurement on its own, and the second communication apparatus does not need to send the channel state information; and the first communication apparatus can determine the v adjustment factors simply based on the pre-configured information or the protocol.

S602: The first communication apparatus performs an encoding procedure on the first transport block based on the v adjustment factors, where the encoding procedure includes, for example, at least one of the following: determining a quantity of bits included in the first transport block, performing rate matching on the first transport block, or performing layer mapping on the first transport block. In addition, the encoding procedure may include some other steps. For example, refer to FIG. 2, which is a schematic diagram of some steps that may be included in the encoding procedure. In this embodiment, the encoding procedure may include all or some of the steps shown in FIG. 2, or the encoding procedure in this embodiment may further include another step in addition to the steps shown in FIG. 2. The following describes the encoding procedure in this embodiment by using some steps. In the following description process, an example is used in which the encoding procedure in this embodiment includes the steps shown in FIG. 2.

(1) Determine a quantity of information bits (which may also be referred to as a quantity of bits) of the first transport block, where the quantity of bits of the first transport block is a size of the first transport block, namely, a TBS of the first transport block.

In an NR system, a network device sends uplink and downlink encoding control information to UE by using a downlink control channel (for example, a PDCCH). The encoding control information includes an MCS, for example, includes an MCS index. For example, the first communication apparatus is the network device, the second communication apparatus is the UE, and the encoding control information corresponds to the first transport block. Then the network device and the UE may determine, based on the MCS and Table 1, the code rate of the first transport block. For details, refer to the description of the step (11) in the encoding procedure described previously.

For example, the first communication apparatus is the network device. To determine the quantity of bits of the first transport block, the network device may first determine a quantity of available REs of a PDSCH on one PRB. For example, the quantity of the available REs of the PDSCH on one PRB is represented as $N'_{RE}$. For a relationship met by $N'_{RE}$, refer to Formula 1.

In addition, to restrict a maximum amount of data that can be transmitted in one PRB of each slot, overall available resources on $n_{PRB}$ may be further computed. For example, in this embodiment, the overall available resources on $n_{PRB}$ are represented by $N_{RE,i}$, where $N_{RE,i}$ is a quantity of available REs in an $i^{th}$ layer of the v layers, and i is an integer greater than or equal to 0 and less than or equal to v. For example, $N_{RE,i}$ min(156, $N_{RE,i}$)×$n_{PRB}$, or $N_{RE,i}$=$N'_{RE}$×$n_{PRB}$, where min(x, y) indicates that the smaller value of x and y is selected, and $N_{RE,i}$ represents a quantity of REs used for data transmission on one PRB in the $i^{th}$ layer, or in other words, $N_{RE,i}$ represents the quantity of available REs in the $i^{th}$ layer of the v layers. Optionally, for the v layers, all of $N_{RE,i}$ corresponding to these layers may be equal to each other. For example, the v layers include a $0^{th}$ layer and a $1^{st}$ layer, and $N_{RE,0}=N_{RE,1}$.

After $N_{RE,i}$ is determined, the quantity of bits of the first transport block may be determined based on $N_{RE,i}$. For example, the quantity of bits of the first transport block is represented as $N_{info}$. For example, $N_{info}$ meets the following relationship:

$$N_{info}=\Sigma_{i=0}^{v-1}(N_{RE,i} \times R \times Q_m \times a_i) \quad \text{(Formula 4)}$$

R represents the code rate determined based on the MCS corresponding to the first transport block, $Q_m$ represents a modulation order of the first transport block, or in other words, $Q_m$ represents a quantity of bits required for generating a complex number of one RE, and $a_i$ represents an adjustment factor corresponding to the $i^{th}$ layer in the v adjustment factors. It can be learned from Formula 4 that, a quantity of bits of the first transport block transmitted in the $i^{th}$ layer of the v layers is $N_{RE,i} \times R \times Q_m \times a_i$.

Optionally, if values of $N_{RE,i}$ corresponding to the v layers are all the same, or in other words, quantities of available REs in the v layers are all the same, $N_{info}$, for example, meets the following relationship:

$$N_{info}=\Sigma_{i=0}^{v-1}(N_{RE,i} \times R \times Q_m \times a_i)=N_{RE,T} \times R \times Q_m \times \Sigma_{i=0}^{v-1}(a_i) \quad \text{(Formula 5)}$$

$N_{RE,T}$ represents a quantity of available REs in each of the v layers. In this case, i is an integer from 0 to (v−1); and all of $N_{RE,i}$ are equal to $N_{RE,T}$.

A physical meaning herein is as follows: First, a quantity of REs that can be mapped to the $i^{th}$ layer of the v layers (excluding a quantity of REs occupied by a DMRS and some other pilots) is computed; and then $N_{RE,i} \times Q_m$, namely, a quantity of bits that can be ultimately mapped to the $i^{th}$ layer, is obtained based on the quantity $Q_m$ of bits required for generating the complex number of one RE. The bits that can be ultimately mapped to the $i^{th}$ layer include information bits that can be ultimately mapped to the $i^{th}$ layer and check bits corresponding to the information bits. Considering that R represents the code rate determined based on the MCS corresponding to the first transport block, the code rate represents a ratio of a quantity of transmitted information bits in one information transmission to a first sum value, where the first sum value is a sum of the quantity of the information bits and a quantity of the check bits. In other words, R represents a ratio of the quantity of information bits of the first transport block to a total quantity of bits that can be carried in the v layers. Then a quantity of bits of the first transport block transmitted in the $i^{th}$ layer of the v layers is $N_{RE,i} \times R \times Q_m$. For the total quantity of information bits that can be transmitted in the v layers, refer to Formula 5. It is worth noting that, herein it cannot be ensured that $N_{info}$ is an integer. However, in the encoding procedure, the first transport block may need to be segmented. For example, the first transport block is segmented into a plurality of CBs. To adapt to a segmentation process, $N_{info}$ needs to be further rounded. A rounding manner is not limited. For example, refer to a manner of rounding a quantity of bits of a transport block in a conventional encoding process.

(2) Perform CRC on the first transport block, that is, the TB CRC shown in FIG. 2.

The first communication apparatus may generate check bits based on a CRC generator polynomial. The check bits may be used at a receive end (for example, the second communication apparatus) of the first transport block to determine, after decoding of information received by the receive end is completed, whether the decoding succeeds.

(3) Segment the first transport block, that is, perform the TB segmentation shown in FIG. 2.

For a segmentation process, refer to the step (13) in the encoding procedure described previously.

(4) Perform channel coding separately on the CBs included in the first transport block, that is, the CB-granularity channel coding shown in FIG. 2.

For a channel coding process, refer to the step (14) in the encoding procedure described previously.

(5) Perform rate matching separately on the CBs included in the first transport block.

An objective of the rate matching is to make a length of bits output after the channel coding match a length of bits to be actually sent in the plurality of layers used to send the transport block. For example, a code rate in LDPC encoding is related to a generator polynomial for the LDPC encoding. When the generator polynomial for the LDPC encoding is fixed, the LDPC encoding is performed at a fixed code rate, and the length of the bits output after the channel coding is performed on the transport block may be greater than the length of the bits to be actually sent in the plurality of layers used to send the transport block, or may be exactly equal to the length of the bits to be actually sent in the plurality of layers used to send the transport block, or may be less than the length of the bits to be actually sent in the plurality of layers used to send the transport block. Based on various relationships between a length of bits to be actually sent in the plurality of layers used to send one transport block and LDPC encoding lengths, a corresponding method may be used to enable the length of the bits output after the channel coding to match the length of the bits to be actually sent in the plurality of layers used to send the transport block.

If the first transport block is segmented into the plurality of CBs in the step (3), the step (5) may be performed; or if the first transport block is not segmented in the step (3), the step (5) may be replaced with: performing rate matching on the first transport block. Alternatively, even if the first transport block is not segmented in the step (3), the step (5) may still be understood as performing rate matching on a unique CB included in the first transport block. A rate matching process is similar, regardless of whether rate matching is performed on the CBs or on the first transport block. In the following description process, rate matching on the CBs is used as an example.

Rate matching on a CB roughly includes several steps, which are separately described below. In the following description process, rate matching on a first CB is used as an example, where the first CB is a CB included in the first transport block. For example, the first CB is any CB included in the first transport block.

In a first step, a first quantity is determined. The first quantity is a quantity of output bits corresponding to the rate matching of the first CB, or in other words, the first quantity is a quantity of bits output after the rate matching is performed on the first CB. The first quantity may be regarded as an expected quantity of bits to be output after the rate matching is performed on the first CB.

For example, when j meets $$j \le C' - \mathrm{mod}\left(\frac{G'}{v \times Q_m}, C'\right) - 1,$$

the first quantity meets a first relationship; or when j does not meet $$j \le C' - \mathrm{mod}\left(\frac{G'}{v \times Q_m}, C'\right) - 1,$$

for example, $$j > C' - \mathrm{mod}\left(\frac{G'}{v \times Q_m}, C'\right) - 1,$$

the first quantity meets a second relationship, where j represents a sequence number of the first CB in the code blocks included in the first transport block, and C' represents a quantity of effectively transmitted code blocks in the first transport block. For example, during initial transmission or when CBG retransmission is not supported, C'=C; or if the encoding control information sent by the first communication apparatus and corresponding to the first transport block indicates that CBG retransmission is supported, C' represents a quantity of to-be-transmitted CBs in the first transport block. $Q_m$ represents a modulation order of the first transport block, and G' represents a total quantity of bits output after the rate matching is performed on all effectively transmitted CBs in the first transport block, for example, $G' = Q_m \times [\Sigma_{i=0}^{v-1}(N_{RE,i} \times a_i)]$, where $N_{RE,i}$ represents the quantity of available REs in the $i^{th}$ layer of the v layers, $a_i$ represents the adjustment factor corresponding to the $i^{th}$ layer of the v layers, mod represents a modulo operation, and $\lfloor x \rfloor$ represents rounding down x.

The first relationship includes, for example:

$$E = v \times Q_m \times \left\lfloor \frac{G'}{v \times Q_m \times C'} \right\rfloor \quad \text{(Formula 6)}$$

The second relationship includes, for example:

$$E = v \times Q_m \times \left\lceil \frac{G'}{v \times Q_m \times C'} \right\rceil \quad \text{(Formula 7)}$$

E represents the first quantity, and $\lceil x \rceil$ in Formula 7 represents rounding up x.

Alternatively, a quantity of bits that can be transmitted in each of the v layers corresponding to the first transport block may be separately computed. The rate matching is separately performed on the CBs included in the first transport block, and an obtained result is a sum of the quantity of bits that can be transmitted in each of the v layers. In this case, for example, $G' = Q_m \times \Sigma_{i=0}^{v-1} \lfloor N_{RE,i} \times a_i \rfloor$.

The first relationship includes, for example:

$$E = Q_m \times \left\lfloor \frac{G'}{Q_m \times C'} \right\rfloor \quad \text{(Formula 8)}$$

The second relationship includes, for example:

$$E = Q_m \times \left\lceil \frac{G'}{Q_m \times C'} \right\rceil \quad \text{(Formula 9)}$$

Alternatively, there may be another manner of computing G', and there may be another implementation of the first relationship and/or the second relationship. This is not limited in this embodiment.

It can be learned from the foregoing formulas that, for example, the first transport block includes a plurality of CBs, and If G' cannot be evenly divided by C', a quantity of bits that are of a previous CB included in the first transport block and are output after the rate matching may be enabled to be less than a quantity of bits that are of a subsequent CB included in the first transport block and are output after the rate matching. Herein, "previous" and "subsequent" are related to a value of j. For example, if $$j \le C' - \mathrm{mod}\left(\frac{G'}{v \times Q_m}, C'\right) - 1,$$

a corresponding CB may be considered as a previous CB included in the first transport block; or if $$j > C' - \mathrm{mod}\left(\frac{G'}{v \times Q_m}, C'\right) - 1,$$

a corresponding CB may be considered as a subsequent CB included in the first transport block.

$$\frac{G'}{v \times Q_m}$$

represents a quantity of modulation symbols of each of the v layers, and mod $$\left(\frac{G'}{v \times Q_m}, C'\right)$$

represents a remainder obtained after modulation symbols of a layer of the v layers are evenly distributed. To minimize an output difference between the CBs, one more modulation symbol (or one RE) is allocated to some CBs (for example, the subsequent CB included in the first transport block) in each layer, and then a total of v more modulation symbols are allocated to these CBs (for example, the subsequent CB included in the first transport block) in the v layers.

In a second step, bit screening is performed on the first CB.

For example, bits output after the channel coding is performed on the first CB may be buffered as a cycle. Based on a redundancy version (RV) for the encoding, a start position $k_0$ of the bit screening may be determined. In the buffered output bits after the channel coding of the first CB, corresponding bits are sequentially fetched starting from $k_0$. For this part of content, refer to the description of the second step in the step (15) in the encoding procedure described previously.

In a third step, bit interleaving is performed on the first CB, or in other words, bit interleaving is performed on bits output after the bit screening is performed on the first CB.

The bit interleaving, for example, is implemented in the following manner:

$$f_{s+w \times Q_m} = e_{s \times \frac{E_r}{Q_m} + w} \quad \text{(Formula 10)}$$

For example, a bit sequence output after the bit screening is performed on the first CB is represented as $e_0$, $e_1, e_2, \ldots, e_{E-1}$, and the bit interleaving is performed on the bit sequence, that is, the bit sequence is converted into $f_0, f_1, f_2, \ldots, f_{E-1}$ based on Formula 10, where s is an integer from 0 to $Q_m$, and w is an integer from $$\frac{E}{Q_m} - 1.$$

After the foregoing three steps are taken, the rate matching on the first CB is completed. A manner of rate matching on each effectively transmitted CB in the first transport block is similar. For details, refer to the description of the rate matching process of the first CB.

(6) Concatenate the bits output after the effectively transmitted CBs in the first transport block undergone the rate matching, that is, perform the CB concatenation shown in FIG. 2.

There may be a plurality of effectively transmitted CBs in the first transport block. The first communication apparatus performs rate matching on each CB. One bit sequence may be output after rate matching is performed on one CB. After rate matching is performed on the plurality of CBs, a plurality of bit sequences may be output. In this case, the first communication apparatus may concatenate the plurality of bit sequences together. For example, the first communication apparatus concatenates the plurality of bit sequences together based on indexes of the CBs included in the first transport block. For example, a bit sequence obtained after the concatenation is referred to as a first bit sequence.

(7) Perform scrambling and constellation mapping on the first bit sequence, that is, the scrambling and constellation mapping shown in FIG. 2.

For this part of content, refer to the step (17) in the encoding procedure described previously.

(8) Perform layer mapping on the at least one encoding symbol.

The layer mapping is to map the at least one encoding symbol to the v layers for transmission, and then a quantity of encoding symbols to which each of the v layers is mapped needs to be determined. For example, for the $i^{th}$ layer of the v layers, a second quantity may be determined, where the second quantity is a quantity of encoding symbols mapped to the $i^{th}$ layer in the at least one encoding symbol; or because the mapping has not started yet in this case, it may also be considered that the second quantity is a quantity of encoding symbols to be allocated to the $i^{th}$ layer in the at least one encoding symbol.

For example, if i meets i≤v-mod($M_{symb} - \Sigma_{i=0}^{v-1} \lfloor N_{RE,i} \times a_i \rfloor$, v)−1, the second quantity meets a third relationship; or if i does not meet i≤v-mod $M_{symb} - \Sigma_{i=0}^{v-1} \lfloor N_{RE,i} \times a_i \rfloor$, v)−1, for example, i>v-mod($M_{symb} - \Sigma_{i=0}^{v-1} \lfloor N_{RE,i} \times a_i \rfloor$, v)−1, the second quantity meets a fourth relationship, where $M_{symb}$ represents a total quantity of the at least one encoding symbol, namely, a quantity of encoding symbols output in the step (7), $N_{RE,i}$ represents the quantity of available REs in the $i^{th}$ layer of the v layers, $a_i$ represents the adjustment factor corresponding to the $i^{th}$ layer of the v layers, $\lfloor x \rfloor$ represents rounding down x, and mod represents a modulo operation. The third relationship includes, for example:

$$M_{symb}^i = \lfloor N_{RE,i} \times a_i \rfloor + \lfloor (M_{symb} - \Sigma_{i=0}^{v-1} \lfloor N_{RE,i} \times a_i \rfloor)/v \rfloor \quad \text{(Formula 11)}$$

The fourth relationship includes, for example:

$$M_{symb}^i = \lfloor N_{RE,i} \times a_i \rfloor + \lceil (M_{symb} - \Sigma_{i=0}^{v-1} \lfloor N_{RE,i} \times a_i \rfloor)/v \rceil \quad \text{(Formula 12)}$$

$M_{symb}^i$ represents the second quantity, and $\lceil x \rceil$ represents rounding up x.

An objective of the step (8) is to allocate the at least one encoding symbol to the v layers based on the adjustment factors, and ensure that the quantity of encoding symbols allocated to each layer essentially meets requirements of the adjustment factors. Because values of the adjustment factors of the layers are not necessarily equal, it needs to be determined, based on $a_i$, that the quantity $M_{symb}^i$ of encoding symbols of the $i^{th}$ layer includes at least $\lfloor N_{RE,i} \times a_i \rfloor$ encoding symbols. When $M_{symb} > \Sigma_{i=0}^{v-1} \lfloor N_{RE,i} \times a_i \rfloor$, in order that all encoding symbols can be sent, remaining encoding symbols may be equally mapped to each layer.

For example, if $G' = Q_m \times \Sigma_{i=0}^{v-1} \lfloor N_{RE,i} \times a_i \rfloor$, $M_{symb}^i = \lfloor N_{RE,i} \times a_i \rfloor$. In this case, it may be considered that the third relationship and the fourth relationship do not exist.

It can be seen that, a quantity of encoding symbols mapped to a layer is related to the adjustment factor of the layer, and then quantities of encoding symbols mapped to different layers may be the same or may be different.

After the quantity of encoding symbols mapped to each of the v layers is determined, the at least one encoding symbol needs to be mapped to the v layers (or in this case, the mapping has not started yet and simply the encoding symbols are allocated to the v layers), and a plurality of manners may be used. For example, in a manner, the at least one encoding symbol is sequentially mapped (or allocated) to the v layers. This manner may be understood as that, the first communication apparatus determines an encoding symbol sequence, where the encoding symbol sequence includes at least one encoding symbol, the at least one encoding symbol is arranged sequentially in the encoding symbol sequence; and the first communication apparatus maps (or allocates) the encoding symbols included in the encoding symbol sequence to all available REs of the v layers, to implement layer mapping in a simple manner and aggregate encoding symbols of each CB onto a single layer to a maximum extent, ensuring that encoding symbols of one CB pass through a same channel. When the SINR of each layer varies greatly from each other, this ensures that some CBs are successfully decoded, thereby reducing a quantity of CBs to be retransmitted. This manner may also be represented as:

$$x_i(j) = d(k) \quad \text{(Formula 13)}$$

$x_i(j)$ represents a $j^{th}$ encoding symbol mapped to the $i^{th}$ layer, and d(k) represents a $k^{th}$ encoding symbol in the encoding symbol sequence. In this case, j may be an integer from 0 to $M_{symb}^i$.

For example, if the at least one encoding symbol includes encoding symbols 0 to 13 and v=2, the encoding symbols included in the encoding symbol sequence are the encoding symbols 0 to 13. For example, the first communication apparatus determines that a quantity of to-be-mapped (or allocated) encoding symbols in a $0^{th}$ layer of the v layers is 4, and a quantity of to-be-mapped (or allocated) encoding symbols in a $1^{st}$ layer of the v layers is 9. During the mapping, the first communication apparatus maps (or allocates) encoding symbols 0 to 3 to the $0^{th}$ layer, and maps (or allocates) encoding symbols 4 to 13 to the $1^{st}$ layer.

For another example, in another manner, the at least one encoding symbol is alternately mapped (or allocated) to the v layers. This manner may be understood as that, the first communication apparatus determines an encoding symbol sequence, where the encoding symbol sequence includes at least one encoding symbol, and the at least one encoding symbol is alternately arranged in the encoding symbol sequence, to implement space diversity of CB transmission and ensure fairness of transmission of each CB; and the first communication apparatus maps (or allocates) the encoding symbols included in the encoding symbol sequence to all available REs of the v layers. This manner may also be represented as follows: If mask(i)<$M_{symb}^i$, the encoding symbols mapped (or allocated) to the $i^{th}$ layer meet:

$$x_i(\text{mask}_i)=d(k) \quad \text{(Formula 14)}$$

For example, $\text{mask}_i$ represents a number of an encoding symbol mapped to (or allocated to) the $i^{th}$ layer in the $i^{th}$ layer. For example, a number of an encoding symbol in the encoding symbol sequence is 3, and the encoding symbol is mapped to a $3^{rd}$ layer; and if the encoding symbol is, for example, a $1^{st}$ encoding symbol mapped to the $3^{rd}$ layer, a number of the encoding symbol in the $3^{rd}$ layer is 0.

The at least one encoding symbol is alternately arranged in the encoding symbol sequence, and a manner of the alternate arrangement is related to a value of v. For example, if the quantity of the at least one encoding symbol is L, an arrangement order of the at least one encoding symbol in the encoding symbol sequence is: $L_{00}$, $L_{01}$, ..., $L_{0(v-1)}$, $L_{10}$, $L_{11}$, ..., where $L_{x1}$, ..., $L_{xv}$ indicates that the at least one encoding symbol is alternately arranged in the encoding symbol sequence, x indicates that a plurality of rounds of arrangement may be performed, and $$x = \left\lceil \frac{L}{v} \right\rceil.$$

Certainly, if L is less than v, the encoding symbol sequence does not include $L_{x(v-1)}$, that is, there may be no any encoding symbol that can be mapped (or allocated) to some of the v layers.

For example, if the at least one encoding symbol includes encoding symbols 0 to 13 and v=2, the encoding symbols included in the encoding symbol sequence are the encoding symbols 0 to 13; and an arrangement order of these encoding symbols in the encoding symbol sequence is: encoding symbols 0, 2, 4, 6, 8, 9, 10, 11, 12, 13, 1, 3, 5, and 7. For example, the first communication apparatus determines that a quantity of to-be-mapped (or allocated) encoding symbols in a $0^{th}$ layer of the v layers is 10, and a quantity of to-be-mapped (or allocated) encoding symbols in a $1^{st}$ layer of the v layers is 4. During the mapping (or allocation), the first communication apparatus maps (or allocates) first 10 encoding symbols in the encoding symbol sequence to the $0^{th}$ layer, that is, maps (or allocates) the encoding symbols 0, 2, 4, 6, 8, 9, 10, 11, 12, and 13 to the $0^{th}$ layer; and maps (or allocates) the remaining four encoding symbols in the encoding symbol sequence to the $1^{st}$ layer, that is, maps (or allocates) the encoding symbols 1, 3, 5, and 7 to the $1^{st}$ layer.

The foregoing example may also be understood as that, the at least one encoding symbol includes encoding symbols 0 to 13, and v=2. For example, the first communication apparatus determines that a quantity of to-be-mapped (or allocated) encoding symbols in a $0^{th}$ layer of the v layers is 10, and a quantity of to-be-mapped (or allocated) encoding symbols in a $1^{st}$ layer of the v layers is 4. During the mapping (or allocation), the first communication apparatus maps (or allocates) an encoding symbol 0 to the $0^{th}$ layer, maps (or allocates) an encoding symbol 1 to the $1^{st}$ layer, maps (or allocates) an encoding symbol 2 to the $0^{th}$ layer, maps (or allocates) an encoding symbol 3 to the $1^{st}$ layer, and so on. After an encoding symbol 7 is mapped (or allocated) to the $1^{st}$ layer, a quantity of encoding symbols mapped (or allocated) to the $1^{st}$ layer is 4, which already meets the quantity of encoding symbols to be mapped (or allocated) to the $1^{st}$ layer. In this case, all remaining encoding symbols 8 to 13 are mapped (or allocated) to the $0^{th}$ layer.

After encoding symbols are allocated to the $i^{th}$ layer of the v layers, these encoding symbols may be mapped to the available REs included in the $i^{th}$ layer. Optionally, regardless of whether sequential mapping or alternate mapping is used, the encoding symbols included in the encoding symbol sequence may be mapped to all available REs of the v layers. It can be learned from the foregoing solution that, the adjustment factor is $0<d_i \leq 1$, which may control the quantity $M_{symb}^i$ of encoding symbols allocated to each layer to be less than or equal to the quantity $N_{RE,i}$ of encoding symbols that can be transmitted in the layer. During actual signal sending, an encoding symbol needs to be mapped to each available physical resource (for example, an available RE), to improve resource utilization and transmission quality. It can be learned from the foregoing formulas that, generally $M_{symb}^i < N_{RE,i}$. In other words, for the $i^{th}$ layer, the quantity of encoding symbols allocated to the $i^{th}$ layer may be less than the quantity of available REs included in the $i^{th}$ layer; and for the $i^{th}$ layer, there may be no any encoding symbol that can be mapped to some REs. In this case, an encoding symbol may be replicated, so that the replicated encoding symbol can be mapped to an RE for which there is originally no any encoding symbol that can be mapped, to enable the encoding symbols to be mapped to all available REs in the $i^{th}$ layer, thereby achieving an effect that an actual layer code rate for transmission in each layer is not equal to each other.

For example, for mapping the encoding symbols to be mapped to the $i^{th}$ layer of the v layers to all available REs of the $i^{th}$ layer, the mapping may be performed in the following manner:

$$\bar{x}(j)=x_i(\text{mod}(k+j,M_{symb}^i)) \quad \text{(Formula 15)}$$

In this case, j may be an integer from 0 to $N_{RE,i}$. $\bar{x}_1(j)$ represents an index j of an encoding symbol mapped to the $i^{th}$ layer, and k represents a start position of the encoding symbol mapping. A process of obtaining the $M_{symb}^i$ coding symbols may be considered as a process (or simply referred to as a first mapping process) of mapping the first transport block to a virtual resource block, and Formula 15 is a process (or simply referred to as a second mapping process) of further mapping the encoding symbols that are mapped to the virtual resource block to PRBs. In addition, when $M_{symb}^i < N_{RE,i}$, some encoding symbols on the virtual resource block may be replicated in a repeated sending manner to the PRBs, to achieve an effect that the encoding symbols are mapped to all the PRBs, so that an actual layer code rate for sending in the $i^{th}$ layer matches the adjustment factor $a_i$ of the $i^{th}$ layer.

(9) Map a layer mapping result to an antenna, that is, perform the MIMO encoding shown in FIG. 2. Details about the process are not described herein again.

(10) Perform IFFT on MIMO-encoded information and add a CP, that is, perform the IFFT+CP shown in FIG. 2.

A function of the IFFT is to change the MIMO-encoded information from frequency domain to time domain, to obtain an effect of OFDM, so that different information can be transmitted in different frequency domain space. The CP is a guard interval between different OFDM symbols, to reduce interference between the OFDM symbols.

In this case, the encoding procedure of the first transport block is completed, and an encoded first transport block is obtained. It needs to be noted that, the numbers of the steps (1) to (10) are merely for ease of description, and do not represent an actual execution sequence of the steps. For example, the step (1) may be performed before the step (2), or may be performed after the step (2), or the two steps may be performed simultaneously.

S603: The first communication apparatus sends the encoded first transport block to the second communication apparatus. Correspondingly, the second communication apparatus receives the encoded first transport block from the first communication apparatus. For example, in this embodiment, the encoded first transport block is also referred to as a first signal.

The steps (2) to (4), steps (6) to (7), steps (9) to (10), and S603 are optional.

In this embodiment, an adjustment factor corresponding to each layer may be determined, and the adjustment factor may be used to determine spectral efficiency of each layer for a signal that is sent based on MIMO. The technical essence is to: determine, based on the adjustment factor, a quantity of encoding symbols mapped to each layer in the step of layer mapping included in the encoding procedure; and if a quantity of encoded bits allocated to a layer is less than a quantity of available REs included in the layer, perform rate matching again to obtain all encoding symbols to be sent in the layer. Because different adjustment factors may be specified for different layers, a code rate for sending information in each layer can be further adjusted on a basis of a code rate that is determined based on an MCS, to obtain different spectral efficiency for different layers. In the layer mapping, the quantity of encoding symbols that can be mapped to each layer needs to be determined based on the adjustment factor, and this essentially affects a quantity of valid REs available for data transmission in a MIMO signal sending process. Therefore, a process of determining a transport block size, a rate matching process, and the like need to be adjusted accordingly. In other words, the transport block size and a quantity of bits output after the rate matching may be determined based on the quantity of valid REs, to ensure that outputs of the rate matching can be allocated based on the adjustment factor to each layer. Considering that a corresponding SINR may be different when the receive end performs receiving in each layer, according to the technical solution in this embodiment, the code rate of each layer determined based on the adjustment factor can match an SINR of the layer as much as possible. For example, when an SINR of a layer is fixed, a layer code rate of the layer can be adjusted by using the adjustment factor of the layer, so that maximum spectral efficiency can be obtained when transmission is performed in the layer by using the layer code rate of the layer. For example, the SINR of a layer is −9 dB, and then the layer code rate of the layer may be enabled, by using the adjustment factor of the layer, to be equal to 0.0397 as much as possible, so that the layer can obtain high throughput and high spectral efficiency. It can be learned that, in this manner, some or all of the layers in MIMO can achieve high spectral efficiency as much as possible, thereby improving transmission quality of these layers.

Figure 7:
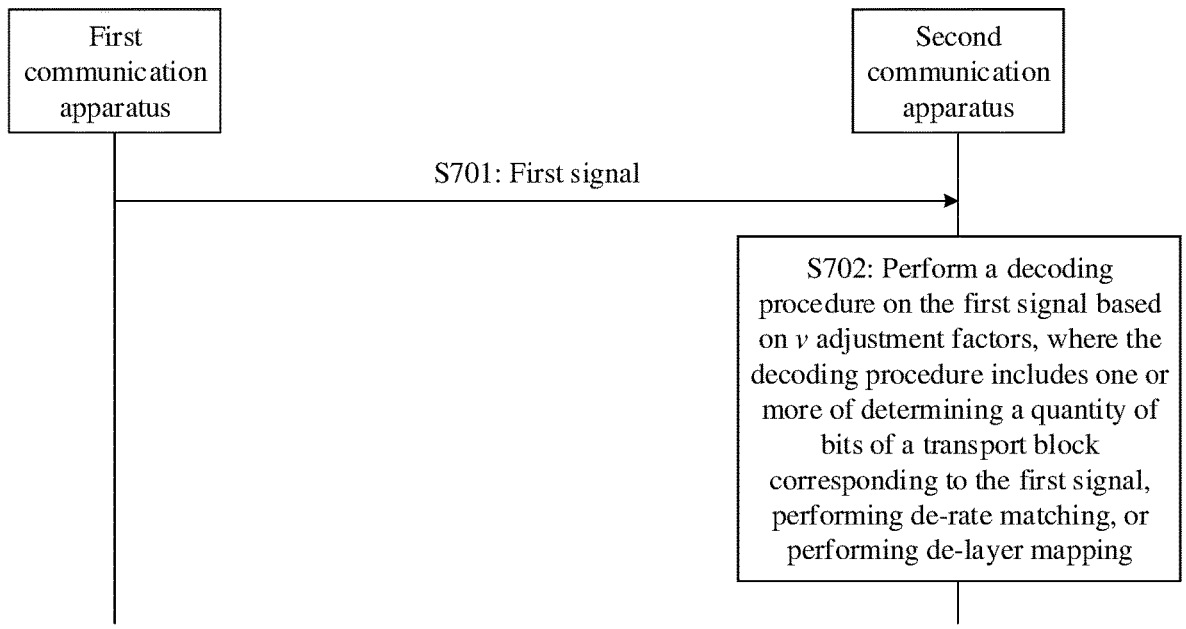
FIG. 7 is a flowchart of another example communication method according to an embodiment of this application.

The embodiment shown in FIG. 6 mainly describes the procedure of encoding the first transport block. The following provides another communication method according to an embodiment of this application. The method mainly relates to a procedure of decoding a received signal. FIG. 7 shows a flowchart of the method.

S701: A first communication apparatus sends a first signal to a second communication apparatus. Correspondingly, the second communication apparatus receives the first signal from the first communication apparatus by using v layers in MIMO. This embodiment may be used in combination with the embodiment shown in FIG. 6. For example, S701 may be a same step as S603 in the embodiment shown in FIG. 6.

S702: The second communication apparatus performs a decoding procedure on the first signal based on v adjustment factors corresponding to the v layers.

The second communication apparatus may first determine the v adjustment factors corresponding to the v layers. The embodiment shown in FIG. 6 describes a manner in which the first communication apparatus determines the v adjustment factors. The second communication apparatus needs to determine the v adjustment factors. One determining manner is: determining the v adjustment factors based on preconfigured information or a protocol. For example, the v adjustment factors may be alternatively pre-configured in the first communication apparatus, or predefined in the protocol; and then the second communication apparatus may determine the v adjustment factors based on the pre-configured information or the protocol.

Alternatively, in another determining manner, the first communication apparatus sends indication information to the second communication apparatus; and correspondingly, the second communication apparatus receives the indication information from the first communication apparatus, where the indication information may explicitly or implicitly indicate the v adjustment factors. For example, the indication information directly indicates the v adjustment factors, is considered as indicating the v adjustment factors in an explicit manner; or the indication information indicates v code rates, so that the second communication apparatus can also determine the v adjustment factors based on the v layer code rates, and this indication manner is considered as implicitly indicating the v adjustment factors.

The indication information indicates the v adjustment factors or the v layer code rates. For example, one indication manner is as follows: The indication information includes first information and second information, where the first information may indicate a manner of determining adjustment factors and/or layer code rates, and the second information may indicate a manner of determining an adjustment factor and/or a layer code rate of an $i^{th}$ layer of the v layers based on the first information; and the v adjustment factors and/or the v layer code rates may be determined based on the first information and the second information. In this way, the first information indicates the manner of determining the adjustment factors and/or the layer code rates, so that there may be a plurality of manners of determining an adjustment factor and/or a layer code rate, thereby improving system flexibility. The second information may indicate a method for determining an adjustment factor and/or a layer code rate based on the first information, so that a code rate of each layer dynamically matches a channel state of the layer during MIMO transmission, thereby obtaining higher transmission efficiency.

The first information and the second information may be sent simultaneously (for example, carried and sent in one message), or may be sent separately, for example, carried and sent in different messages. Alternatively, the first information may be specified in the protocol, or may be preconfigured in the first communication apparatus and the second communication apparatus. In this case, the first communication apparatus may not need to send the first information. In another possibility, the first information may be implemented in a plurality of manners (for example, Table 3 to Table 5 to be described below are three implementations of the first information). If the second communication apparatus obtains a plurality of types of the first information, the first communication apparatus may further send third information to the second communication apparatus. The third information may indicate one type of the first information, that is, the third information indicates selecting one type of the first information for application. For example, the protocol specifies the following three types of the first information in Table 3 to Table 5. In this case, the first communication apparatus may send the third information to the second communication apparatus. The third information, for example, indicates Table 4. In this case, the second communication apparatus may determine to use Table 4 as the first information.

The first information indicates the adjustment factors and/or the layer code rates, where the indication may be in an explicit manner or in an implicit manner. For example, for an implementation of the first information, refer to Table 3. The first information may include some or all of items in Table 3, where one row in Table 3 is referred to as one item.

TABLE 3

| Index | Value | Code rate × 1024 |
|---|---|---|
| 000 | 0 | R |
| 001 | −1 | R − $CR_{step}$ |
| 010 | −2 | R − 2 × $CR_{step}$ |
| 011 | −3 | R − 3 × $CR_{step}$ |

As shown in Table 3, it may be considered that the layer code rates are indicated in an explicit manner. The first information includes indication information of the layer code rates, for example, indexes; and a corresponding layer code rate $R_i$ is indicated by using an index. If an index value corresponding to an $i^{th}$ layer is "000", it indicates that a layer code rate of the $i^{th}$ layer is $R_i=R\times a_i=R$, that is, $a_i=1$. If the index value corresponding to the $i^{th}$ layer is "001", it indicates that the layer code rate of the $i^{th}$ layer is $R_i=R\times a_i=R-CR_{step}$, that is, $a_i=1-CR_{step}/R$. If the index value corresponding to the $i^{th}$ layer is "0110", it indicates that the layer code rate of the $i^{th}$ layer is $R_i=R\times a_i=R-2\times CR_{step}$, that is, $a_i=1-2\times CR_{step}/R$. Table 3 uses an example in which three bits are used to represent an index. In actual application, a quantity of bits used to indicate an index may be greater than 3 or less than 3. $CR_{step}$ represents a step value, and a value of $CR_{step}$ is, for example, determined by the first communication apparatus. The first communication apparatus may send the value of $CR_{step}$ to the second communication apparatus (for example, the first communication apparatus is a network device, the second communication apparatus is UE, and the network device may send the value of $CR_{step}$ to the second communication apparatus by using an RRC message, a media access control (MAC) control element (CE), DCI, or the like); or the value of $CR_{step}$ may be preconfigured in the first communication apparatus and the second communication apparatus, or the value of $CR_{step}$ may be predefined by using the protocol, or the like. R represents a code rate determined based on an MCS of a first transport block. The "value" indicates information that participates in computing with the layer code rate in the third column. For example, if the value is −1, it indicates that a corresponding layer code rate is R+(−1×$CR_{step}$); or if the value is −2, it indicates that a corresponding layer code rate is R+(−2× $CR_{step}$). Alternatively, the second column may be removed from Table 3. After the second column is removed, Table 3 may still be considered as the first information, or the first information includes some or all of the items in Table 3.

It can be learned from the example in Table 3 that, the first information specifies several manners of determining the layer code rates. Alternatively, the third column in Table 3 may be replaced with corresponding adjustment factors, that is, the first information indicates several manners of determining the adjustment factors. Alternatively, a fourth column may be further added to Table 3, where the fourth column includes an adjustment factor corresponding to each index, that is, the first information indicates several manners of determining the adjustment factors and the layer code rates.

For example, the second information is implemented by using a bitmap, and a quantity of bits included in the bitmap may be equal to a total quantity of bits of indexes corresponding to layers to be indicated by the second information. For example, if a manner of computing layer code rates or adjustment factors of some of the v layers is fixed and is not affected by another layer, the bitmap may exclude bits used to indicate the layers; or if a manner of computing layer code rates or adjustment factors of some of the v layers is variable and may be affected by another layer, the bitmap may include bits used to indicate the layers. For example, v=4, and a layer code rate of a $0^{th}$ layer is determined based on the MCS of the first transport block, and does not need to be indicated; and layer code rates of a $1^{st}$ layer, a $2^{nd}$ layer, and a $3^{rd}$ layer each may be affected by another layer. Therefore, the second information may indicate a layer code rate of the $1^{st}$ layer, a layer code rate of the $2^{nd}$ layer, and a layer code rate of the $3^{rd}$ layer. Table 3 is used as an example. The bitmap may include nine bits, the nine bits correspond to three indexes in Table 3, and the three indexes indicate the layer code rates of the three layers. For example, the bitmap is "000001010", indicating that the layer code rate of the $1^{st}$ layer is a code rate corresponding to the index "000" in Table 3, namely, R; the layer code rate of the $2^{nd}$ layer is a code rate corresponding to the index "001" in Table 3, namely, R−$CR_{step}$; and the layer code rate of the $3^{rd}$ layer is a code rate corresponding to the index "010" in Table 3, namely, R−2×$CR_{step}$.

For another example, for another implementation of the first information, refer to Table 4. The first information may include some or all of items in Table 4, where one row in Table 4 is referred to as one item.

TABLE 4

| Index | Value | Code rate × 1024 |
|---|---|---|
| 00 | 0 | R |
| 01 | 1 | $CR_{step}$ (negative) |
| 10 | 2 | 2 × $CR_{step}$ (negative) |
| 11 | 3 | 3 × $CR_{step}$ (negative) |

The first information shown in Table 4 does not directly indicate the layer code rates, but indirectly indicates the layer code rates in a manner of indicating a step value. Therefore, it may be considered that the layer code rates are implicitly indicated. When a transport block is mapped to the plurality of layers, SINRs of the layers are generally in descending order, that is, an SINR of the $0^{th}$ layer is the largest, and an SINR of a last layer is the smallest. For example, a layer code rate of the $0^{th}$ layer may be determined based on the MCS corresponding to the first transport block. In other words, the layer code rate of the $0^{th}$ layer is a code rate determined based on the MCS corresponding to the first transport block. In this case, layer code rates of the other layers may descend progressively. The first information shown in Table 4 is designed based on this idea.

Similarly, indexes in Table 4 represent indexes of code rates. Table 4 uses an example in which two bits represent an index of a code rate. In actual application, a quantity of bits used to indicate an index of a layer may be greater than 2 or less than 2. $CR_{step}$ represents the step value. For details about $CR_{step}$, refer to preceding descriptions. R represents the code rate determined based on the MCS of the first transport block. The "value" in Table 4 represents information that participates in computing with the code rate in the third column. For example, if the value is 1, and the third column indicates negative adjustment, it indicates that a corresponding layer code rate is an anchor value $-CR_{step}$; or if the value is 2, and the third column indicates negative adjustment, it indicates that a corresponding layer code rate is an anchor value $-2 \times CR_{step}$. Alternatively, the second column may be removed from Table 4. After the second column is removed, Table 4 may still be considered as the first information, or the first information includes some or all of the items in Table 4. If a code rate corresponding to one index is allocated to an $i^{th}$ layer, an anchor value corresponding to the index is, for example, a layer code rate corresponding to an $(i-1)^{th}$ layer; or an anchor value corresponding to a code rate corresponding to one index is, for example, the layer code rate corresponding to the $0^{th}$ layer. For example, for the layer code rate allocated to the $i^{th}$ layer in the third column in Table 4, if its anchor value is the layer code rate corresponding to the $(i-1)^{th}$ layer, for example, the layer code rate corresponding to the $(i-1)^{th}$ layer is $R-2 \times CR_{step}$, the layer code rate of the $i^{th}$ layer is $R-CR_{step}-2 \times CR_{step}-R-3 \times CR_{step}$. For another example, for the layer code rate allocated to the $i^{th}$ layer in the third column in Table 4, if its anchor value is the layer code rate corresponding to the $0^{th}$ layer, for example, the layer code rate corresponding to the $0^{th}$ layer is R, the layer code rate of the $i^{th}$ layer is $R-2 \times CR_{step}$.

It can be learned from the example in Table 4 that, the first information specifies several manners of determining the layer code rates, that is, the first information indicates several manners of determining the layer code rates. Alternatively, the third column in Table 4 may be replaced with corresponding adjustment factors, that is, the first information indicates several manners of determining the adjustment factors. Alternatively, a fourth column may be further added to Table 4, where the fourth column includes an adjustment factor corresponding to each layer, that is, the first information indicates several manners of determining the adjustment factors and the layer code rates.

For example, the second information is still implemented by using a bitmap. For example, v=4. The layer code rate of the $0^{th}$ layer is determined based on the MCS of the first transport block, and does not need to be indicated; and layer code rates of a $1^{st}$ layer, a $2^{nd}$ layer, and a $3^{rd}$ layer each may be affected by another layer. Therefore, the second information may indicate a layer code rate of the $1^{st}$ layer, a layer code rate of the $2^{nd}$ layer, and a layer code rate of the $3^{rd}$ layer. Table 4 is used as an example. The bitmap may include six bits, the six bits correspond to three indexes in Table 4, and the three indexes indicate the layer code rates of the three layers. For example, the bitmap is "011011", indicating that the layer code rate of the $1^{st}$ layer is a code rate corresponding to the index "01" in Table 4; the layer code rate of the $2^{nd}$ layer is a code rate corresponding to the index "10" in Table 4; and the layer code rate of the $3^{rd}$ layer is a code rate corresponding to the index "11" in Table 4. For example, for a layer code rate of each layer, a corresponding anchor point value is the layer code rate corresponding to the $0^{th}$ layer, and the layer code rate corresponding to the $0^{th}$ layer is R; and then the layer code rate of the $1^{st}$ layer is $R-CR_{step}$, the layer code rate of the $2^{nd}$ layer is $R-2 \times CR_{step}$, and the layer code rate of the $3^{rd}$ layer is $R-3 \times CR_{step}$.

For still another example, for still another implementation of the first information, refer to Table 5. The first information may include some or all of items in Table 5, where one row in Table 5 is referred to as one item, and Table 5 may also be considered as a proper subset of Table 4.

TABLE 5

| Index | Value | Code rate × 1024 |
|---|---|---|
| 0 | 0 | R |
| 1 | 1 | $CR_{step}$ (negative) |

The first information shown in Table 5 does not directly indicate the layer code rates, but indirectly indicates the layer code rates in a manner of indicating a step value, and therefore may be considered as implicitly indicating the layer code rates.

Similarly, indexes in Table 5 represent indexes of code rates. Table 5 uses an example in which one bit represents an index of a code rate. In actual application, a quantity of bits used to indicate an index of a layer may be greater than 1. For other features of Table 5, refer to the description of Table 4.

It can be learned from the example in Table 5 that, the first information specifies several manners of determining the layer code rates, that is, the first information indicates several manners of determining the layer code rates. Alternatively, the third column in Table 5 may be replaced with corresponding adjustment factors, that is, the first information indicates several manners of determining the adjustment factors. Alternatively, a fourth column may be further added to Table 5, where the fourth column includes an adjustment factor corresponding to each layer, that is, the first information indicates several manners of determining the adjustment factors and the layer code rates.

For example, the second information is still implemented by using a bitmap. For example, v=4. The layer code rate of the $0^{th}$ layer is determined based on the MCS of the first transport block, and does not need to be indicated; and layer code rates of a $1^{st}$ layer, a $2^{nd}$ layer, and a $3^{rd}$ layer each may be affected by another layer. Therefore, the second information may indicate a layer code rate of the $1^{st}$ layer, a layer code rate of the $2^{nd}$ layer, and a layer code rate of the $3^{rd}$ layer. Table 5 is used as an example. The bitmap may include three bits, the three bits correspond to three indexes in Table 5, and the three indexes indicate the layer code rates of the three layers. For example, the bitmap is "111", indicating that the layer code rate of the $1^{st}$ layer is a code rate corresponding to the index "1" in Table 5; the layer code rate of the $2^{nd}$ layer is the code rate corresponding to the index "1" in Table 5; and the layer code rate of the $3^{rd}$ layer is also the code rate corresponding to the index "1" in Table 5. For example, for a layer code rate of an $i^{th}$ layer, a corresponding anchor point value is a layer code rate corresponding to an $(i-1)^{th}$ layer, and the layer code rate corresponding to the $0^{th}$ layer is R; and then the layer code rate of the $1^{st}$ layer is $R-CR_{step}$, the layer code rate of the $2^{nd}$ layer is $R-CR_{step}-CR_{step}=R-2 \times CR_{step}$, and the layer code rate of the $3^{rd}$ layer is $R-2 \times CR_{step}-CR_{step}=R-3 \times CR_{step}$.

After determining the v adjustment factors, the second communication apparatus may perform a decoding procedure on the first signal based on the v adjustment factors. The decoding procedure includes, for example, one or more of the following: determining a quantity of bits of a transport block corresponding to the first signal, performing de-rate matching, or performing de-layer mapping. In addition, the decoding procedure may further include some other steps. For example, refer to FIG. 4, which shows some steps that may be included in the decoding procedure. In this embodiment, the decoding procedure may include all or some of the steps shown in FIG. 4, or the decoding procedure in this embodiment may further include another step in addition to the steps shown in FIG. 4. The following describes the decoding procedure in this embodiment by using some steps. In the following description process, an example is used in which the decoding procedure in this embodiment includes the steps shown in FIG. 4.

(a) Determine the quantity of bits in the transport block corresponding to the first signal. The transport block corresponding to the first signal is, for example, referred to as a second transport block, and the second transport block is a transport block obtained in a process of decoding the first signal by the second communication apparatus. In an ideal case, the second transport block is the same as the first transport block. A quantity of bits of the second transport block is a size of the second transport block, namely, a TBS of the second transport block.

The second communication apparatus determines the quantity of bits of the transport block corresponding to the first signal. For a determining manner, for example, refer to the step (1) in the embodiment shown in FIG. 6.

(b) Perform CP decoding and FFT on the first signal, that is, the CP decoding+FFT shown in FIG. 4.

The step (b) may be considered as a process inverse to the step (10) in the embodiment shown in FIG. 6. A main objective is to remove the CP from time domain, and transform the received signal from time domain to frequency domain. For example, information obtained after the CP decoding and the FFT are performed on the first signal is referred to as third information.

(c) Perform MIMO decoding on the third information, that is, the MIMO decoding shown in FIG. 4. The step (c) may be considered as a process inverse to the step (9) in the embodiment shown in FIG. 6.

In an ideal case (for example, in a case in which there is no interference or no noise), outputs of the MIMO decoding are outputs of the layer mapping at the transmit end. For example, an output result of the step (c) is the same as an output result of the step (8) in the embodiment shown in FIG. 6. For more descriptions about the step (c), refer to the step (ac) in the decoding procedure described previously.

(d) Perform de-layer mapping on MIMO-decoded information, that is, the de-layer mapping shown in FIG. 4.

A process of the de-layer mapping performed by the second communication apparatus may be considered as a process inverse to the process of the layer mapping performed by the first communication apparatus, that is, the step (d) may be considered as a process inverse to the step (8) in the embodiment shown in FIG. 6. The second communication apparatus may obtain a demodulation symbol of each of the v layers based on the MIMO decoding process, and combine the demodulation symbol of each of the v layers based on the adjustment factor corresponding to each of the v layers. For example, the combination may be summation or averaging of demodulation symbols having a same original index, so that an ultimate demodulation symbol of each layer may be obtained. The second communication apparatus may output ultimate demodulation symbols of all the v layers in a sequential or alternate manner, to obtain a demodulation symbol sequence. In an ideal case, the demodulation symbol sequence output by the second communication apparatus is the same as the encoding symbol sequence determined by the first communication apparatus in the embodiment shown in FIG. 6. Therefore, it may also be considered that the second communication apparatus outputs an encoding symbol sequence, where the encoding symbol sequence may include at least one encoding symbol.

(e) Perform constellation de-mapping and descrambling on the at least one encoding symbol, that is, the constellation de-mapping+descrambling shown in FIG. 4.

The constellation de-mapping is a process of determining bit information based on the at least one encoding symbol. In an ideal case, bits obtained after the constellation de-mapping is performed on the at least one encoding symbol may be the same as the bits obtained after the first bit sequence is scrambled in the embodiment shown in FIG. 6. The descrambling is descrambling the bits obtained after the constellation de-mapping is performed on the at least one encoding symbol, and a descrambling process is inverse to the process of scrambling the first bit sequence in the embodiment shown in FIG. 6. For example, information, which is obtained by descrambling the bits obtained after the constellation de-mapping is performed on the at least one encoding symbol, is referred to as a second bit sequence. In an ideal case, the first bit sequence and the second bit sequence are the same.

(f) Obtain decoded bits of each effectively transmitted CB in the second transport block corresponding to the first signal, that is, the decoded soft bit information at a CB granularity obtained in FIG. 4. The step (f) may be considered as a process inverse to the step (6) in the embodiment shown in FIG. 6.

For example, the second communication apparatus may determine a quantity of the decoded bits corresponding to each effectively transmitted CB in the second transport block, to determine, from the second bit sequence, the decoded bits corresponding to each effectively transmitted CB in the second transport block. For example, for a first CB, a corresponding quantity of decoded bits is a first quantity, and the first quantity is a same feature as the first quantity in the embodiment shown in FIG. 6. For a manner in which the second communication apparatus determines the first quantity, refer to the embodiment shown in FIG. 6.

(g) Perform de-rate matching on each effectively transmitted CB in the second transport block. The step (g) may be considered as a process inverse to the step (5) in the embodiment shown in FIG. 6.

The second communication apparatus has determined the decoded bits corresponding to each effectively transmitted CB in the second transport block, and may further perform de-rate matching for the decoding corresponding to each CB. For more descriptions about the step (g), refer to the step (ag) in the decoding procedure described previously.

(h) Perform decoding and CRC on each effectively transmitted CB in the second transport block, that is, the CB-granularity channel decoding+CRC shown in FIG. 4. The step (h) may be considered as a process inverse to the step (4) in the embodiment shown in FIG. 6.

(i) Perform CRC on the second transport block, that is, the TB CRC shown in FIG. 4.

After the decoding and the CRC are separately performed on each effectively transmitted CB in the second transport block corresponding to the first signal, the CBs may be combined to obtain the second transport block. After obtaining the second transport block, the second communication apparatus may perform CRC on the second transport block, to determine whether the second transport block has been correctly transmitted.

In this case, the process of decoding the first signal by the second communication apparatus is completed. It needs to be noted that, the numbers of the steps (a) to (i) are merely for ease of description, and do not represent an actual execution sequence of the steps. For example, the step (a) may be performed before the step (b), or may be performed after the step (b), or the two steps may be performed simultaneously.

The steps (b) to (c), steps (e) to (f), steps (h) to (i) are optional.

When the second communication apparatus receives the information by using the v layers, SINRs corresponding to the v layers may be different. In this embodiment, an adjustment factor is specified respectively for each layer in MIMO, and a layer code rate of a corresponding layer can be adjusted by using an adjustment factor, so that code rates of the layers may be different. In this way, an actual layer code rate of each layer matches a parameter of the second communication apparatus for the layer, such as an SINR of the layer, so that some or all of the layers can reach a maximum value of spectral efficiency as much as possible, thereby improving transmission quality of these layers. For technical effects of this embodiment, refer to the description of the embodiment shown in FIG. 6.

Figure 8:
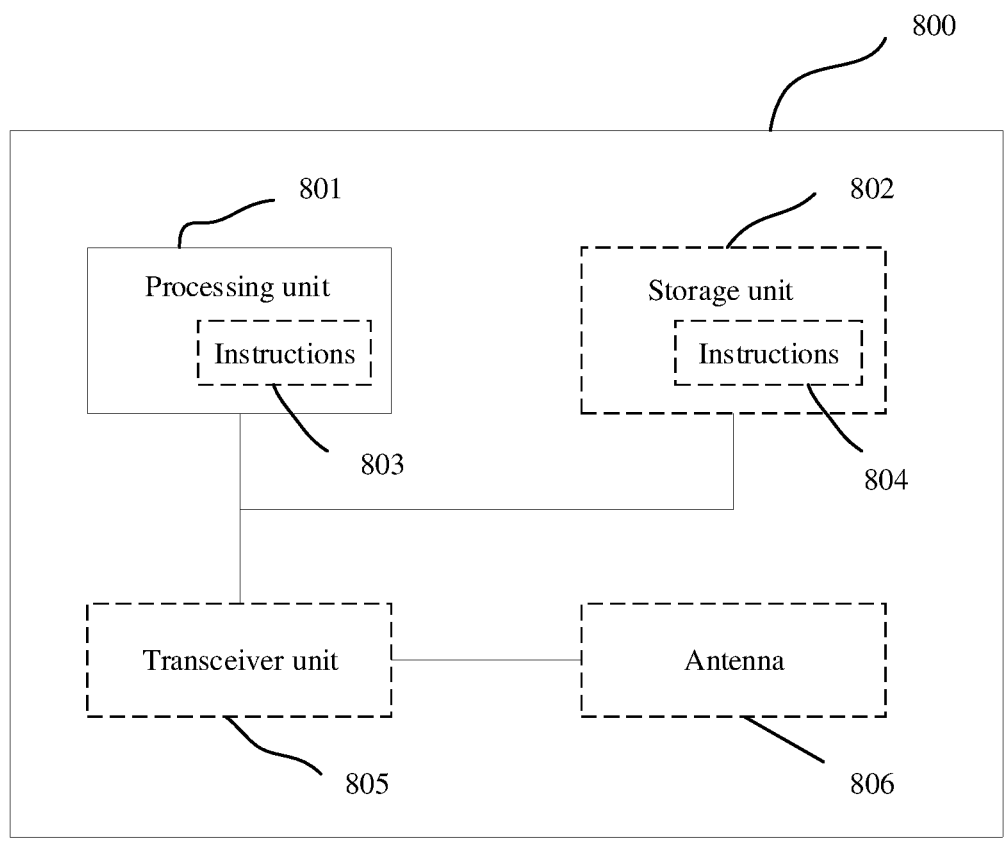
FIG. 8 is a schematic block diagram of an example communication apparatus according to an embodiment of this application.

FIG. 8 is a schematic diagram of a structure of an example communication apparatus according to an embodiment of this application. The communication apparatus 800 may be the first communication apparatus or a processing apparatus in the first communication apparatus according to either one of the embodiment shown in FIG. 3 or the embodiment shown in FIG. 6, and is configured to implement the method corresponding to the first communication apparatus in the foregoing method embodiments. Alternatively, the communication apparatus 800 may be the second communication apparatus or a processing apparatus in the second communication apparatus according to either one of the embodiment shown in FIG. 3 or the embodiment shown in FIG. 6, and is configured to implement the method corresponding to the second communication apparatus in the foregoing method embodiments. For specific functions, refer to descriptions in the foregoing method embodiments. For example, a processing apparatus is a chip system.

The communication apparatus 800 includes a processing unit 801. The processing unit 801 may include one or more processors, and may implement a control function to some extent. The processor may be a general-purpose processor, a dedicated processor, or the like. For example, the processor includes a baseband processor, a central processing unit, or the like. The baseband processor may be configured to process a communication protocol and communication data. The central processing unit may be configured to: control the communication apparatus 800, execute a software program, and/or process data. Different processors may be independent components, or may be integrated into one or more processors, for example, integrated into one or more application-specific integrated circuits. The processing unit 801 may perform the foregoing steps S601, S602, and S702.

Optionally, the communication apparatus 800 includes a storage unit 802, configured to store instructions 804. The instructions 804 may be run on the processor, so that the communication apparatus 800 performs the method described in the foregoing method embodiments. Optionally, the storage unit 802 may further store data. For example, the storage unit 802 may be implemented by one or more memories. The processor and the memory may be separately disposed, or may be integrated together.

Optionally, the communication apparatus 800 may include instructions 803 (which may also referred to as code or a program in some cases), and the instructions 803 may be run on the processor, so that the communication apparatus 800 performs the method described in the foregoing embodiments. The processor 801 may store data.

Optionally, the communication apparatus 800 may further include a transceiver unit 805 and an antenna 806. The transceiver unit 805 may be implemented by a radio frequency circuit, a transceiver, a transceiver circuit, a transceiver device, an input/output interface, and the like; and is configured to implement receiving and sending functions of the communication apparatus 800 by using the antenna 806. The transceiver unit 805 and the antenna 806 may be alternatively an integrated transceiver module, that is, the antenna may be alternatively located in the transceiver unit 805. The transceiver unit 805 may perform the steps S603 and S701.

Optionally, the communication apparatus 800 may further include one or more of the following components: a wireless communication module, an audio module, an external memory interface, an internal memory, a universal serial bus (USB) port, a power management module, an antenna, a speaker, a microphone, an input/output module, a sensor module, a motor, a camera, a display, or the like. It may be understood that, in some embodiments, the communication apparatus 800 may include more or fewer components, or some components are integrated, or some components are split. These components may be hardware, or software, or may be implemented by using a combination of software and hardware.

It needs to be noted that, the communication apparatus may be a terminal device, or may be a chip used in the terminal device, or another combined part, component, or the like that can implement the functions of the terminal device. When the communication apparatus is the terminal device, the transceiver unit may be a transmitter and a receiver, or an integrated transceiver, and may include an antenna, a radio frequency circuit, and the like. The processing unit may be a processor, for example, a baseband chip. When the communication apparatus is a component that has the functions of the terminal device, the transceiver unit may be a radio frequency unit, and the processing module may be a processor. When the communication apparatus is a chip system, the transceiver unit may be an input/output interface of the chip system, and the processing unit may be a processor of the chip system, for example, a central processing unit (CPU).

The processor and the transceiver that are described in this embodiment may be implemented on an integrated circuit (IC), an analog IC, a radio frequency integrated circuit (RFID), a mixed-signal IC, an application-specific integrated circuit (ASIC), a printed circuit board (PCB), an electronic device, or the like. The communication apparatus described in this specification may be implemented as an independent device (for example, an independent integrated circuit or a mobile phone), or may be a part of a large device (for example, a module that can be embedded in another device). For details, refer to the foregoing descriptions about the terminal device and the network device. Details are not described herein again.

An embodiment of this application provides a terminal device. The terminal device (referred to as UE for ease of description) may be used in the foregoing embodiments. The terminal device includes corresponding means, units, and/or circuits for implementing the functions of the first communication apparatus or the second communication apparatus according to either one of the embodiment shown in FIG. 3 or the embodiment shown in FIG. 6. For example, the terminal device includes a transceiver module, configured to support the terminal device in implementing receiving and sending functions; and a processing module, configured to support the terminal device in processing a signal.

Figure 9:
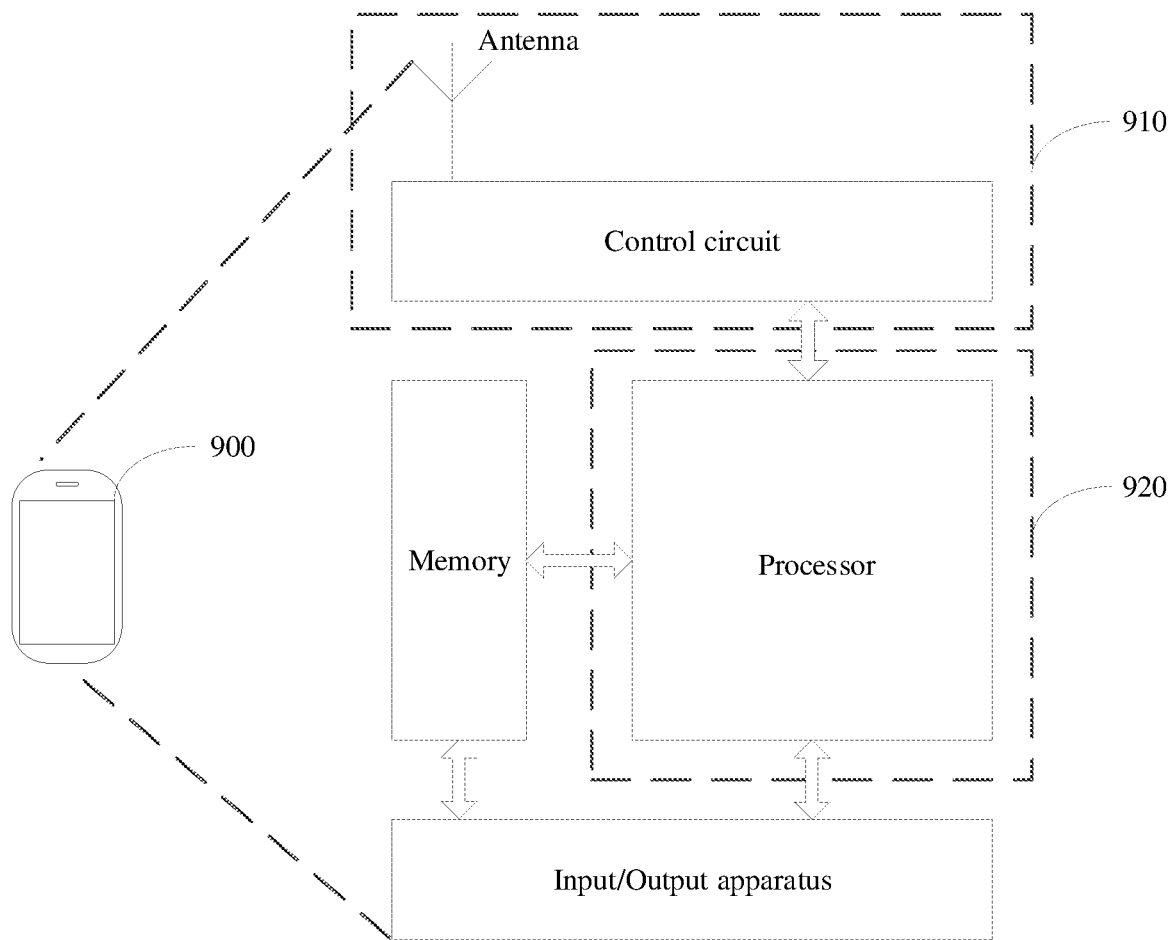
FIG. 9 is a schematic block diagram of an example terminal device according to an embodiment of this application.

FIG. 9 is a schematic diagram of a structure of an example terminal device according to an embodiment of this application.

The terminal device 900 is applicable to an architecture shown in any one of the accompanying drawings in FIG. 1 and FIG. 5B to FIG. 5D. For ease of description, FIG. 9 only shows main components of the terminal device 900. As shown in FIG. 9, the terminal device 900 includes a processor, a memory, a control circuit, an antenna, and an input/output apparatus. The processor is mainly configured to: process a communication protocol and communication data, control the entire terminal device 900, execute a software program, and process data of the software program. The memory is mainly configured to: store the software program and the data. The control circuit is mainly configured to: convert a baseband signal and a radio frequency signal, and process the radio frequency signal. The antenna is mainly configured to: receive and send a radio frequency signal in a form of an electromagnetic wave. The input/output apparatus, such as a touchscreen, a display, a microphone, or a keyboard, is mainly configured to: receive data input by a user, and output data to the user.

A person skilled in the art may understand that for ease of description, FIG. 9 shows only one memory and only one processor. In some embodiments, the terminal device 900 may include a plurality of processors and memories. The memory may also be referred to as a storage medium, a storage device, or the like. This is not limited in this embodiment.

In an example, the antenna and the control circuit that have receiving and sending functions may be considered as a transceiver unit 910 of the terminal device 900, and the processor having a processing function may be considered as a processing unit 920 of the terminal device 900. As shown in FIG. 9, the terminal device 900 includes the transceiver unit 910 and the processing unit 920. The transceiver unit may be alternatively referred to as a transceiver device, a transceiver, a transceiver apparatus, or the like. Optionally, a component configured to implement a receiving function in the transceiver unit 910 may be considered as a receiving unit; and a component configured to implement a sending function in the transceiver unit 910 may be considered as a sending unit, that is, the transceiver unit 910 includes the receiving unit and the sending unit. For example, the receiving unit may be alternatively referred to as a receiver, a receiving device, a receiving circuit, or the like; and the sending unit may be alternatively referred to as a transmitter, a transmitting device, a transmitting circuit, or the like.

An embodiment of this application further provides a network device. The network device is applicable to the foregoing embodiments. The network device includes means, units, and/or circuits for implementing the functions of the first communication apparatus according to either one of the embodiment shown in FIG. 3 or the embodiment shown in FIG. 6. For example, the network device includes a transceiver module, configured to support the terminal device in implementing receiving and sending functions; and a processing module, configured to support the network device in processing a signal.

Figure 10:
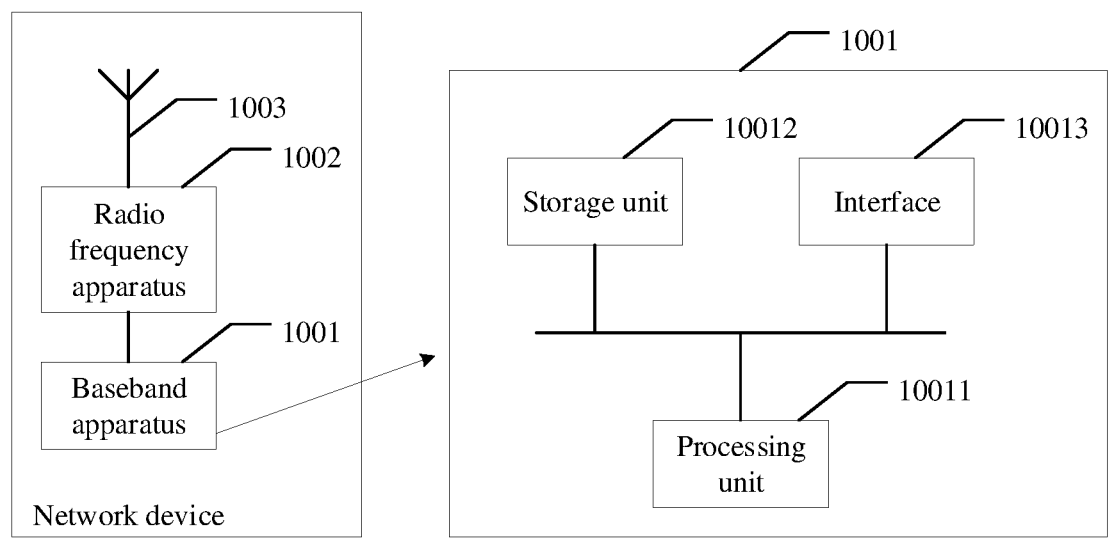
FIG. 10 is a schematic block diagram of an example network device according to an embodiment of this application.

FIG. 10 is a schematic diagram of a structure of an example network device according to an embodiment of this application. As shown in FIG. 10, the network device is applicable to an architecture shown in any one of the accompanying drawings in FIG. 1 and FIG. 5B to FIG. 5D. The network device includes a baseband apparatus 1001, a radio frequency apparatus 1002, and an antenna 1003. In an uplink direction, the radio frequency apparatus 1002 receives, by using the antenna 1003, information sent by a terminal device, and sends, to the baseband apparatus 1001 for processing, the information sent by the terminal device. In a downlink direction, the baseband apparatus 1001 processes information of the terminal device, and sends the information to the radio frequency apparatus 1002. The radio frequency apparatus 1002 processes the information of the terminal device, and then sends the processed information to the terminal device by using the antenna 1003.

The baseband apparatus 1001 includes one or more processing units 10011, a storage unit 10012, and an interface 10013. The processing unit 10011 is configured to support the network device in performing the functions of the network device in the foregoing method embodiments. The storage unit 10012 is configured to store a software program and/or data. The interface 10013 is configured to exchange information with the radio frequency apparatus 1002. The interface includes an interface circuit, configured to input and output information. In an implementation, the processing unit is an integrated circuit, for example, one or more ASICs, one or more digital signal processors (DSP), one or more field programmable gate arrays (FPGA), or a combination of these integrated circuits. The storage unit 10012 and the processing unit 10011 may be located in a same chip, namely, on-chip storage elements. Alternatively, the storage unit 10012 and the processing unit 10011 may be located on different circuits, namely, off-chip storage elements. The storage unit 10012 may be one memory, or may be a collective name of a plurality of memories or storage elements.

The network device may implement some or all of the steps in the foregoing method embodiments in a form of scheduling a program by one or more processing units, for example, implement corresponding functions of the first communication apparatus according to either one of the embodiment shown in FIG. 3 or the embodiment shown in FIG. 6. The one or more processing units may support radio access technologies of a same standard, or may support radio access technologies of different standards.

When several embodiments provided in this application are implemented in a form of software functional units and sold or used as an independent product, the product may be stored in a computer-readable storage medium. The computer software product is stored in a storage medium, and includes several instructions for instructing a computer device (which may be a personal computer, a server, a network device, or the like) to perform all or some of the steps of the methods described in embodiments of this application. The foregoing computer-readable storage medium may be any usable medium that can be accessed by a computer. The following provides an example but does not impose a limitation: The computer-readable medium may include a random access memory (RAM), a read-only memory (ROM), or any other medium that can be used to carry or store expected program code in a form of instructions or a data structure and can be accessed by the computer.

The foregoing descriptions are merely non-limiting examples of specific implementations, and are not intended to limit the protection scope, which is intended to cover any variation or replacement readily determined by a person of ordinary skill in the art. Therefore, the claims shall define the protection scope.

What is claimed is:

1. A communication method, comprising:
   determining v adjustment factors corresponding to v layers in multiple-input multiple-output, wherein one layer corresponds to one adjustment factor, and v is an integer greater than 1; and
   performing an encoding procedure on a transport block based on the v adjustment factors, wherein the encoding procedure comprises: determining a quantity of bits of the transport block based on the v adjustment factors, performing rate matching based on the v adjustment factors, and performing layer mapping based on the v adjustment factors.

2. The method according to claim 1, wherein a value of any one of the v adjustment factors is greater than 0 and less than 1.

3. The method according to claim 1, wherein the determining of the quantity of bits of the transport block based on the v adjustment factors comprises: determining the quantity of bits of the transport block by using the following formula:

$\Sigma_{i=0}^{v-1}(N_{RE,i} \times R \times Q_m \times a_i)$, wherein $N_{RE,i}$ represents a quantity of available resource elements in an $i^{th}$ layer of the v layers, R represents a code rate determined based on a modulation and coding scheme corresponding to the transport block, $Q_m$ represents a modulation order of the transport block, and $a_i$ represents an adjustment factor corresponding to the $i^{th}$ layer in the v adjustment factors.

4. The method according to claim 3, wherein the performing of the rate matching based on the v adjustment factors comprises:
   determining a first quantity, wherein the first quantity is a quantity of output bits corresponding to the rate matching of a first code block, and the first code block is comprised in the transport block; and
   when j meets $$j \le C' - \mathrm{mod}\left(\frac{G'}{v \times Q_m}, C'\right) - 1,$$

the first quantity meets a first relationship; or when j does not meet $$j \le C' - \mathrm{mod}\left(\frac{G'}{v \times Q_m}, C'\right) - 1,$$

the first quantity meets a second relationship, wherein
   j represents a sequence number of the first code block in code blocks comprised in the transport block; and
   C' represents a quantity of effectively transmitted code blocks in the transport block, $Q_m$ represents the modulation order of the transport block, $G' = Q_m \times \lfloor \Sigma_{i=0}^{v-1}(N_{RE,i} \times a_i)\rfloor$, $N_{RE,i}$ represents the quantity of available resource elements in the $i^{th}$ layer of the v layers, $a_i$ represents the adjustment factor corresponding to the $i^{th}$ layer of the v layers, mod represents a modulo operation, and $\lfloor x \rfloor$ represents rounding down x.

5. The method according to claim 4, wherein the first relationship comprises:

$$E = v \times Q_m \times \left\lfloor \frac{G'}{v \times Q_m \times C'} \right\rfloor,$$

wherein
E represents the first quantity; and
wherein the second relationship comprises:

$$E = v \times Q_m \times \left\lceil \frac{G'}{v \times Q_m \times C'} \right\rceil,$$

wherein
E represents the first quantity, and $\lceil x \rceil$ represents rounding up x.

6. The method according to claim 3, wherein the performing of the layer mapping based on the v adjustment factors comprises:
   determining a second quantity, wherein the second quantity is a quantity of encoding symbols mapped to the $i^{th}$ layer of the v layers, the encoding symbols mapped to the $i^{th}$ layer of the v layers belong to at least one encoding symbol, and the at least one encoding symbol is obtained after the rate matching in the encoding procedure, scrambling, and constellation mapping are performed on the transport block, and when i meets $i \le v-\mathrm{mod}(M_{symb}-\Sigma_{i=0}^{v-1}\lfloor N_{RE,i}\times a_i\rfloor, v)-1$, the second quantity meets a third relationship; or when i does not meet $i \le v-\mathrm{mod}(M_{symb}-\Sigma_{i=0}^{v-1}\lfloor N_{RE,i}\times a_i\rfloor, v)-1$, the second quantity meets a fourth relationship; wherein
   $M_{symb}$ represents a total quantity of the at least one encoding symbol, $N_{RE,i}$ represents the quantity of available resource elements in the $i^{th}$ layer of the v layers, $a_i$ represents the adjustment factor corresponding to the $i^{th}$ layer of the v layers, $\lfloor x \rfloor$ represents rounding down x, and mod represents a modulo operation.

7. The method according to claim 6, wherein the third relationship comprises:

$$M_{symb}^i = \lfloor N_{RE,i} \times a_i \rfloor + \lfloor (M_{symb}-\Sigma_{i=0}^{v-1}\lfloor N_{RE,i}\times a_i\rfloor)/v \rfloor,$$
wherein $M_{symb}^i$ represents the second quantity; and
wherein the fourth relationship comprises:

$$M_{symb}^i = \lfloor N_{RE,i} \times a_i \rfloor + \lceil (M_{symb}-\Sigma_{i=0}^{v-1}\lfloor N_{RE,i}\times a_i\rfloor)/v \rceil,$$
wherein $M_{symb}^i$ represents the second quantity, and $\lceil x \rceil$ represents rounding up x.

8. The method according to claim 1, wherein the performing of the layer mapping based on the v adjustment factors comprises:
   determining an encoding symbol sequence, wherein the encoding symbol sequence comprises at least one encoding symbol, and the at least one encoding symbol is arranged sequentially in the encoding symbol sequence, or the at least one encoding symbol is arranged alternately in the encoding symbol sequence; and
   mapping the encoding symbols comprised in the encoding symbol sequence to all available resource elements of the v layers.

9. The method according to claim 1, further comprising:
   determining v pieces of channel state information corresponding to the v layers, wherein one layer corresponds to one piece of channel state information; and
   determining the v adjustment factors based on the v pieces of channel state information.

10. The method according to claim 9, wherein the determining of the v pieces of channel state information corresponding to the v layers comprises:

measuring channel states corresponding to the v layers to obtain the v pieces of channel state information; or receiving the v pieces of channel state information.

11. The method according to claim 1, further comprising:

sending indication information to an apparatus that receives the transport block, wherein the indication information indicates the v adjustment factors, or indicates v code rates that correspond to the v layers and are determined based on the v adjustment factors.

12. A communication method, comprising:

receiving a signal by using v layers in multiple-input multiple-output; and performing a decoding procedure on the signal based on v adjustment factors corresponding to the v layers, wherein one layer corresponds to one adjustment factor, and the decoding procedure comprises: determining a quantity of bits of a transport block corresponding to the signal based on the v adjustment factors, performing de-rate matching based on the v adjustment factors, and performing de-layer mapping based on the v adjustment factors, wherein v is an integer greater than 1.

13. The method according to claim 12, wherein a value of any one of the v adjustment factors is greater than 0 and less than 1.

14. The method according to claim 12, wherein the determining of the quantity of bits of a transport block corresponding to the signal based on the v adjustment factors comprises: determining the quantity of bits of the transport block by using the following formula:

$\Sigma_{i=0}^{v-1}(N_{RE,i} \times R \times Q_m \times a_i)$, wherein $N_{RE,i}$ represents a quantity of available resource elements in an $i^{th}$ layer of the v layers, R represents a code rate determined based on a modulation and coding scheme corresponding to the transport block, $Q_m$ represents a modulation order of the transport block, and $d_i$ represents an adjustment factor corresponding to the $i^{th}$ layer in the v adjustment factors.

15. The method according to claim 14, wherein the performing of the de-rate matching based on the v adjustment factors comprises:

determining a first quantity, wherein the first quantity is a quantity of input bits corresponding to the de-rate matching of a first code block, and the first code block is comprised in the transport block corresponding to the signal; and when j meets $$j \leq C' - \mathrm{mod}\left(\frac{G'}{v \times Q_m}, C'\right) - 1,$$

the first quantity meets a first relationship; or when j does not meet $$j \leq C' - \mathrm{mod}\left(\frac{G'}{v \times Q_m}, C'\right) - 1,$$

the first quantity meets a second relationship, wherein j represents a sequence number of the first code block in code blocks comprised in the transport block; and C' represents a quantity of effectively transmitted code blocks in the transport block, $Q_m$ represents the modulation order of the transport block, $G' = Q_m \times \Sigma_{i=0}^{v-1}(N_{RE,i} \times a_i)$, $N_{RE,i}$ represents the quantity of available resource elements in the $i^{th}$ layer of the v layers, $a_i$ represents the adjustment factor corresponding to the $i^{th}$ layer of the v layers, mod represents a modulo operation, and $\lfloor x \rfloor$ represents rounding down x.

16. The method according to claim 15, wherein the first relationship comprises:

$$E = v \times Q_m \times \left\lfloor \frac{G'}{v \times Q_m \times C'} \right\rfloor,$$

wherein

E represents the first quantity; and wherein the second relationship comprises:

$$E = v \times Q_m \times \left\lceil \frac{G'}{v \times Q_m \times C'} \right\rceil,$$

wherein

E represents the first quantity, and $\lceil x \rceil$ represents rounding up x.

17. The method according to claim 14, wherein when i meets $i \leq v\text{-mod}(M_{symb} - \Sigma_{i=0}^{v-1} \lfloor N_{RE,i} \times a_i \rfloor, v) - 1$, a quantity of encoding symbols mapped to the $i^{th}$ layer of the v layers meets a third relationship; or when i does not meet $i \leq v\text{-mod}(M_{symb} - \Sigma_{i=0}^{v-1} \lfloor N_{RE,i} \times a_i \rfloor, v) - 1$, a quantity of encoding symbols mapped to the $i^{th}$ 1 layer of the v layers meets a fourth relationship; wherein $M_{symb}$ represents a total quantity of the at least one encoding symbol, $N_{RE,i}$ represents the quantity of available resource elements in the $i^{th}$ layer of the v layers, $a_i$ represents the adjustment factor corresponding to the $i^{th}$ layer of the v layers, $\lfloor x \rfloor$ represents rounding down x, and mod represents a modulo operation.

18. The method according to claim 17, wherein the third relationship comprises:

$M_{symb}^i = \lfloor N_{RE,i} \times a_i \rfloor + \lfloor (M_{symb} - \Sigma_{i=0}^{v-1} \lfloor N_{RE,i} \times a_i \rfloor)/v \rfloor$, wherein $M_{symb}^i$ represents the second quantity of encoding symbols mapped to the $i^{th}$ layer; and wherein the fourth relationship comprises:

$M_{symb}^i = \lfloor N_{RE,i} \times a_i \rfloor + \lceil (M_{symb} - \Sigma_{i=0}^{v-1} \lfloor N_{RE,i} \times a_i \rfloor)/v \rceil$, wherein $M_{symb}^i$ represents the quantity of encoding symbols mapped to the $i^{th}$ layer, and $\lceil x \rceil$ represents rounding up x.

19. The method according to claim 12, wherein the performing of the de-layer mapping based on the v adjustment factors comprises:

obtaining an encoding symbol sequence to which all available resource elements of the v layers are mapped, wherein the encoding symbol sequence comprises at least one encoding symbol, and the at least one encoding symbol is arranged sequentially in the encoding symbol sequence, or the at least one encoding symbol is arranged alternately in the encoding symbol sequence.

20. The method according to claim 12, further comprising:
   measuring channel states corresponding to the v layers to obtain v pieces of channel state information, wherein one layer corresponds to one piece of channel state information; and
   sending the v pieces of channel state information.

* * * * *